(12) United States Patent
Bhatt et al.

(10) Patent No.: US 9,990,613 B1
(45) Date of Patent: Jun. 5, 2018

(54) BILL PAYMENT USING DIRECT FUNDS TRANSFER

(71) Applicant: Square, Inc., San Francisco, CA (US)

(72) Inventors: Anish Bhatt, San Francisco, CA (US); Charles Kimble, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 384 days.

(21) Appl. No.: 14/569,491

(22) Filed: Dec. 12, 2014

(51) Int. Cl.
*G06Q 40/00* (2012.01)
*G06Q 20/10* (2012.01)
*G06Q 20/26* (2012.01)

(52) U.S. Cl.
CPC .......... *G06Q 20/102* (2013.01); *G06Q 20/26* (2013.01)

(58) Field of Classification Search
USPC ...................................................... 705/35–45
See application file for complete search history.

(56) References Cited

U.S. PATENT DOCUMENTS

| | | | |
|---|---|---|---|
| 5,220,501 A | | 6/1993 | Lawlor et al. |
| 5,283,829 A | * | 2/1994 | Anderson ................. 705/40 |
| 5,715,298 A | * | 2/1998 | Rogers ................. 379/91.01 |
| 5,832,460 A | * | 11/1998 | Bednar et al. ............ 705/27.2 |
| 5,870,724 A | | 2/1999 | Lawlor et al. |
| 5,884,288 A | * | 3/1999 | Chang et al. ................ 705/40 |
| 5,963,647 A | * | 10/1999 | Downing et al. ............ 705/39 |
| 6,032,133 A | * | 2/2000 | Hilt et al. .................... 705/40 |
| 6,039,250 A | * | 3/2000 | Ito et al. ..................... 235/380 |
| 6,865,558 B1 | | 3/2005 | Pierce et al. |
| 7,107,243 B1 | * | 9/2006 | McDonald et al. .......... 705/40 |
| 7,194,437 B1 | * | 3/2007 | Britto et al. ................. 705/40 |
| 7,644,037 B1 | * | 1/2010 | Ostrovsky .................... 705/40 |
| 7,657,477 B1 | | 2/2010 | Chaffee |
| 7,930,248 B1 | | 4/2011 | Lawson et al. |
| 8,131,643 B2 | * | 3/2012 | Battaglini et al. ........... 705/43 |
| 8,510,220 B2 | * | 8/2013 | Rackley et al. .............. 705/40 |
| 8,630,947 B1 | * | 1/2014 | Freund ......................... 705/40 |
| 8,630,948 B1 | | 1/2014 | Hildebrand |

(Continued)

OTHER PUBLICATIONS

Final Office Action dated Dec. 13, 2017, for U.S. Appl. No. 14/569,515, of Bhatt, A., et al., filed Dec. 12, 2014.

(Continued)

*Primary Examiner* — Stephanie Ziegle
(74) *Attorney, Agent, or Firm* — Baker Botts L.L.P.

(57) ABSTRACT

Introduced here is a technology that enables a bill payer, who is an account holder at a financial institution (e.g., a bank), to send a bill payment to a bill payee by submitting, via a financial application of the financial institution, the bill payee's identifier and a bill payment amount, where funds for the bill payment amount are transferred directly to the bill payee substantially instantaneously upon the bill payer's request. The technology involves communication between a computer system of a financial institution ("financial institution system"), a mobile financial application installed on a bill payer's mobile device, and a third-party, remote computer system of a payment service ("PSS"). Upon receiving the identifier and amount from the financial institution system, the PSS identifies payment card information of the bill payer and the bill payee, and executes, or triggers execution of, the transfer of funds for the bill payment.

24 Claims, 14 Drawing Sheets

(56) References Cited

U.S. PATENT DOCUMENTS

| | | | |
|---|---|---|---|
| 2001/0034682 A1* | 10/2001 | Knight et al. ................. | 705/35 |
| 2002/0023055 A1* | 2/2002 | Antognini et al. ............ | 705/40 |
| 2002/0035488 A1 | 3/2002 | Aquila et al. | |
| 2002/0087469 A1 | 7/2002 | Ganesan et al. | |
| 2002/0116331 A1 | 8/2002 | Cataline et al. | |
| 2002/0128967 A1 | 9/2002 | Meyer et al. | |
| 2003/0004867 A1* | 1/2003 | Kight et al. ................... | 705/39 |
| 2003/0024979 A1 | 2/2003 | Hansen et al. | |
| 2004/0019605 A1* | 1/2004 | Keown et al. ............ | 707/104.1 |
| 2004/0064407 A1* | 4/2004 | Kight et al. ................... | 705/40 |
| 2004/0111367 A1* | 6/2004 | Gallagher et al. ............ | 705/39 |
| 2006/0080232 A1* | 4/2006 | Epps ............................. | 705/39 |
| 2006/0206425 A1* | 9/2006 | Sharma ......................... | 705/40 |
| 2006/0224508 A1* | 10/2006 | Fietz ..................... | G06Q 20/10 |
| | | | 705/40 |
| 2007/0179872 A1* | 8/2007 | Macalka et al. ............... | 705/35 |
| 2007/0244811 A1* | 10/2007 | Tumminaro ........... | G06Q 20/10 |
| | | | 705/39 |
| 2007/0255653 A1* | 11/2007 | Tumminaro ........... | G06Q 20/10 |
| | | | 705/39 |
| 2008/0015982 A1 | 1/2008 | Sokolic et al. | |
| 2008/0097905 A1* | 4/2008 | Neofytides et al. ........... | 705/43 |
| 2008/0249936 A1* | 10/2008 | Miller et al. ................... | 705/40 |
| 2009/0089193 A1 | 4/2009 | Paintin | |
| 2010/0023450 A1* | 1/2010 | Scipioni ........................ | 705/40 |
| 2010/0042538 A1* | 2/2010 | Dheer .................... | G06Q 20/10 |
| | | | 705/40 |
| 2010/0114606 A1 | 5/2010 | Snyder | |
| 2010/0138312 A1 | 6/2010 | Britto et al. | |
| 2010/0280871 A1 | 11/2010 | Goertz et al. | |
| 2011/0004551 A1 | 1/2011 | Armes et al. | |
| 2011/0082789 A1 | 4/2011 | Boyd | |
| 2011/0106677 A1* | 5/2011 | Elbizri ........................... | 705/30 |
| 2011/0208600 A1 | 8/2011 | Aharoni et al. | |
| 2011/0213707 A1* | 9/2011 | Jackson et al. ................ | 705/44 |
| 2012/0136781 A1* | 5/2012 | Fridman ................ | G06Q 10/00 |
| | | | 705/40 |
| 2012/0166334 A1* | 6/2012 | Kimberg ............... | G06Q 20/401 |
| | | | 705/44 |
| 2013/0066771 A1* | 3/2013 | Ciurea ............... | G06Q 30/0201 |
| | | | 705/39 |
| 2013/0085936 A1* | 4/2013 | Law et al. ..................... | 705/40 |
| 2013/0198061 A1* | 8/2013 | Dheer et al. ................... | 705/39 |
| 2014/0025564 A1 | 1/2014 | Evans | |
| 2014/0114852 A1* | 4/2014 | Rajagopal ............. | G06Q 20/10 |
| | | | 705/44 |
| 2014/0214649 A1 | 7/2014 | DuCharme et al. | |
| 2015/0046320 A1 | 2/2015 | Baldwin | |
| 2015/0088732 A1 | 3/2015 | DeVan, Jr. et al. | |

OTHER PUBLICATIONS

Non-Final Office Action dated Jul. 26, 2017, for U.S. Appl. No. 14/569,515, of Bhatt, A, et al., filed Dec. 12, 2014.

Advisory Action dated Feb. 16, 2018, for U.S. Appl. No. 14/569,515, of Bhatt, A., et al., filed Dec. 12, 2014.

* cited by examiner

FIG. 9

BILL PAYMENT USING DIRECT FUNDS TRANSFER

BACKGROUND

Paying bills is a burden for many individuals due to the large amount of time required for writing and mailing checks, and the uncertainty associated with keeping track of bill payments. Further, using checks can result in additional expenses in many cases (e.g., the cost of envelopes, postage, etc.). Some banks and other financial institutions have attempted to address this problem by providing online bill payment services for account holders. However, these services do not address all of the problems with bill payment. For example, with some banks, payments generally must be scheduled individually by the account holder, and the payments may take a week of time to get processed. As such, an account holder faces issues of possible missed payments and/or the inconvenience of tracking due dates.

BRIEF DESCRIPTION OF THE DRAWINGS

The technology introduced here may be better understood by referring to the following Detailed Description in conjunction with the accompanying drawings, in which like reference numerals indicate identical or functionally similar elements.

FIGS. 7-12 are user interface diagrams illustrating example interfaces relating to the bill payment technology.

DETAILED DESCRIPTION

Figure 1A:
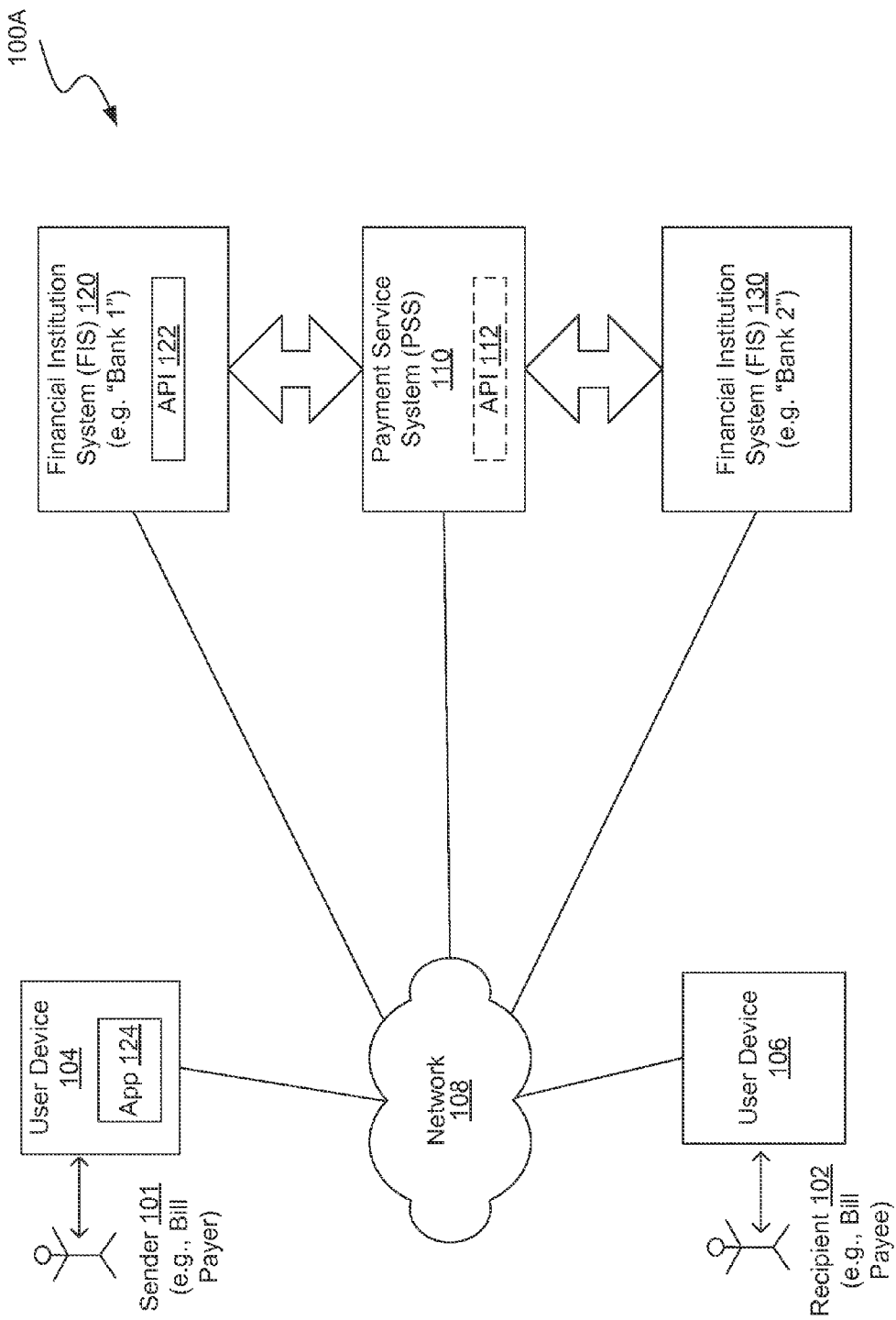
FIGS. 1A, 1B, and 1C are block diagrams illustrating network-based environments in which a bill payment technology can be implemented.

Introduced here is a technology that enables an individual ("bill payer"), who is an account holder at a financial institution (e.g., a bank), to send a bill payment by submitting, via a financial application of the financial institution, an identifier of another individual ("bill payee") and a bill payment amount, where monetary funds for the bill payment is transferred directly to the bill payee substantially instantaneously upon the bill payer's request ("the bill payment technology"). Briefly described, the bill payment technology involves communication between a computer system of a financial institution ("financial institution system"), a mobile financial application installed on a bill payer's mobile device, and a third-party, remote computer system of a payment service provider, or payment service, (the "payment service system" or the "PSS"). The mobile financial application is executed by the mobile device and is configured to communicate with the financial institution system to provide an interface, at the mobile device, that allows a bill payer to access various financial services provided by the financial institution. Among many things (e.g., check account balance, view statements, etc.), the mobile financial application enables the bill payer to specify a bill payment amount and an identifier of a bill payee to pay a bill. The mobile financial application communicates this information (directly and/or indirectly via the financial institution system) to the PSS, which then executes or triggers execution of the transfer of funds to carry out the bill payment.

Among other benefits, the bill payment technology, which employs a remote, third-party payment service, enables an account holder of a financial institution to send funds to a payment recipient within a relatively short time, as compared to conventional bill payment implementations (e.g., an automated clearing house (ACH) transfer between payer and payee accounts takes at least 2-3 days). Moreover, since the account holder can initiate a bill payment simply by providing an identifier of the payment recipient, the bill payment technology greatly reduces the inconvenience of having to remember an inordinate amount of information about the recipient, such as a mailing address.

Consider the following example scenario in which the bill payment technology can be implemented. An account holder at a bank, downloads a mobile banking application ("the Payer App") onto his mobile device (e.g., smartphone or tablet computer) and launches the Payer App to access financial services provided by the bank. The account holder, or bill payer, initiates a "Pay a Bill" service offered through the Payer App to send a bill payment to an individual, i.e., a bill payee, to pay, for example, dog-walking service. The bill payer inputs an amount and an identifier of the bill payee ("payee identifier"). The identifier can be, for example, an email address of the bill payee.

The Payer App transmits, onto a communications network, the information received from the bill payer to a computer system of the bank (or "banking system"). The banking system transmits, onto the communications network, a bill payment request to the PSS via an application programing interface (API), where the bill payment request includes the amount and the payee identifier. In some embodiments, the bill payment request also includes account information of the bill payer who has initiated the bill payment. In some embodiments, the Payer App transmits, onto the communications network, the bill payment request directly to the PSS via an API, which may be the same or different from the API discussed above. In some embodiments, the Payer App can also identify the account information of the bill payer in response to the request from the bill payer, and transmit that information along with the amount and the payee identifier to the PSS via the API.

In some embodiments, the account information of the bill payer can include payment card information associated with a payment card of the bill payer. The payment card can be, for example, a debit card issued by the bank to the bill payer. The payment card information can include, for example, debit card number, expiration date, and a card verification value (CVV). In some embodiments, the account information of the bill payer can include financial account information, such as a bank account number and a routing number. In some embodiments, the account information of the bill payer can include simply an identification of a financial account of the bill payer at a particular financial institution.

Upon receiving the bill payment request, the PSS identifies whether the payee identifier is associated with a payment card. In some embodiments, the PSS can identify the payment card by accessing a database that stores association information, or data, between the payee identifier and the payment card (and/or payment card information that identifies the payment card). The association data can be stored previously by the PSS in past transactions in which the payee identifier has been utilized. In one example, the past transaction can be another bill payment request where a different bill payer has requested a bill payment to be sent to the same bill payee. In another example, the past transaction can be a request for a bill payment that has been initiated by the bill payee to request money from a bill payer (e.g., the same bill payer in the example scenario or a different bill payer). In yet another example, the past transaction can be a request to simply transfer money (i.e., not necessarily for the purpose of bill payment) in which the bill payee has been involved. In this example, the payee identifier could be used to receive the money (i.e., the bill payee is a money recipient), or it could be used to send money (i.e., the bill payee is a money sender). The request to transfer money can be initiated through a mobile financial application (of a financial institution system), or directly through the payment service system (i.e., unrelated to the financial institution system).

Upon identifying the payment card of the bill payee, the PSS can execute, or trigger execution of, the transfer of funds for the bill payment. If the PSS is not able to identify an existing payment card associated with the payee identifier, the PSS causes a message to be sent to the bill payee based on the payee identifier. For example, the PSS causes an email message to be sent to an email address of the bill payee, where that email address has been provided by the bill payer to initiate the bill payment. The message is configured to prompt the bill payee to submit payment card information associated with a payment card of the bill payee. In some embodiments, the PSS performs validation on the payment card information received to verify that the card is valid (e.g., expired card, invalid card number, invalid CVV, etc.). Upon receiving the payment card information, the PSS can execute, or trigger execution of, the transfer of funds for the bill payment.

The PSS also identifies a payment card of the bill payer ("payer payment card") in order to execute, or process, the transfer of funds. The PSS can identify the payer payment card by analyzing the payer account information of the bill payer (included in the bill payment request). For example, based on debit card information associated with the bill payer's debit card issued by the bank, the PSS can identify a bank account of the bill payer, and cause funds to transfer out of that bank account to process the bill payment request. In some embodiments, the PSS can identify the payer payment card based on a stored association between an identifier associated with the bill payer and the payer payment card. The stored association is performed in a previous transaction in which the bill payer has utilized one or more payment services provided by the PSS. Note that in such embodiments, the banking system and/or the Payer App may not send any account information to the PSS, where the PSS simply receives the identifier associated with the bill payer. The identifier can be, for example, an email address or a telephone number.

With the payer's payment card information and the payee's payment card information, the PSS can cause funds to be deposited into the bill payee account substantially instantaneously upon the bill payer's request submitted at the Payer App. In some embodiments, the funds are transferred via a debit transfer. As used here, the term "debit transfer" refers to a transfer of funds into a debit account of an individual, where a debit card network receives a request to transfer an amount of money, or funds, and carries out the request, and in turn the appropriate card issuer can receive and process the request by transferring money to the appropriate card account. As used here, the term "substantially instantaneously" refers to a short period of time relative to a conventional bill payment implementation (e.g., via ACH). For example, substantially instantaneously can refer to 5 seconds, 10 seconds, 30 seconds, 10 minutes, 2 hours, 24 hours, or any other time period that is less than a time period associated with the conventional implementation. In some embodiments, once the funds are deposited, the PSS can transmit a money transfer confirmation to the Payer App for display to the bill payer. In this way, the bill payer can receive an instant confirmation (indicative of certainty) that the bill payment has been received by the bill payee.

According to various embodiments of the bill payment technology, while the funds are deposited into a financial account of the bill payee ("bill payee account") (e.g., bill payee's bank account) substantially instantaneously, the funds are not necessarily transferred directly from the bank account of the bill payer ("bill payer account"). In some embodiments, the funds are first transferred from a financial account of the PSS into the bill payee account, where the PSS requests for a reimbursement from the bill payer account. In some embodiments, the PSS receives the reimbursement funds from the bill payer account before it actually transfers the funds to the bill payee account. In such embodiments, the PSS does not utilize funds of its own.

In some embodiments, the reimbursement funds are transferred into the financial account of the PSS via a ledger entry adjustment. The term "ledger entry adjustment" refers to an accounting practice executed internally by a financial institution, in which data entries of two or more accounts within an internal database are updated, or adjusted, to effect a transfer of funds between the two or more accounts. In some embodiments where the ledger entry adjustment is performed, the Payer App communicates with the financial institution to execute the ledger entry adjustment between a financial account associated with the PSS and a financial account associated with the bill payer. The Payer App, in such embodiments, provides information sufficient for the financial institution to perform the ledger entry adjustment, such as account numbers of the two financial accounts and a transfer amount; in such scenario, debit card information, for example, is not needed. In some embodiments, the reimbursement funds are transferred into the financial account of the PSS via an ACH transfer. In some embodiments, the reimbursement funds are transferred into the financial account of the PSS via a debit transfer. Further details regarding how the funds are transferred will be discussed below with reference to the figures.

In some embodiments, the bill payer can choose to send a bill payment to more than one bill payee. For example, the bill payer can submit, via the Payer App, two identifiers to specify that the bill payer wants to send bill payments to two bill payees. In this example, the bill payer can submit one bill payment amount that can be applied to both bill payees, or a different payment amount for each bill payee. The Payer App can then forward the information to have the bill payment request processed by the PSS, as discussed above.

In some embodiments, the PSS can aggregate bill payment requests for a particular bill payee, as identified by the bill payee's identifier, to generate an accumulated bill payment amount. In such embodiments, the PSS performs an additional operation to determine whether there are additional bill payment requests that have been submitted using the same identifier for the bill payee. Upon identification of the additional bill payment requests, the PSS can cause an accumulated funds amount to be transferred to the bill payee, who would receive the funds as one bill payment (e.g., a "lump sum"), as opposed to individual bill payment amounts. For example, a bill payer Z works as a dog-walker and has several clients who wish to pay the bill payer Z. Instead of receiving several bill payments (e.g., $5, $15, $50, etc.), the bill payer Z would receive an accumulated amount (e.g., $70) from the PSS. In this example, the PSS would request for respective reimbursement funds from each of the clients (e.g., via ledger entry adjustment, ACH, or debit).

In some embodiments, the bill payee, as opposed to the bill payer, can initiate a bill payment by requesting that a bill payment be sent to the bill payee. Consider an example scenario in which the bill payee is a landlord who needs to request rent payments from a tenant. In the example scenario, the bill payee can be an account holder at a bank that offers its financial services via a mobile banking application ("the Payee App"). The bank can be, for example, the same or a different bank as the one used by the bill payer. The Payee App can have similar functionalities as the Payer App used by the bill payer as discussed above.

The bill payee initiates a "Create a Bill" service offered through the Payee App to send, or request, a bill payment from the bill payee for the month's rent. The bill payee inputs an amount and an identifier of the bill payer ("payer identifier"). The identifier can be, for example, an email address of the bill payer. As a result, a request for bill payment is initiated and executed similarly to the process discussed above with respect to sending a bill payment.

First, the Payee App transmits, onto a communications network, the information received from the bill payee to a computer system of the bank (or "banking system"). The banking system transmits, onto the communications network, a bill request to the PSS via an application programing interface (API), where the bill request includes the amount and the payer identifier, in addition to account information of the bill payee who has initiated the bill request. In some embodiments, the Payee App transmits, onto the communications network, the bill request to the PSS via an API, which may be the same or different from the API discussed above. In such embodiments, the Payee App identifies the account information of the bill payee in response to the bill request from the bill payee, and transmits that information along with the amount and the payee identifier to the PSS. The account information of the bill payee can include payment card information associated with a payment card of the bill payer (e.g., debit card number, expiration date, and a card verification value (CVV)).

Upon receiving the bill request, the PSS identifies a payment card of the bill payer ("payer card") and a payment card of the bill payee ("payee card"). In particular, the PSS can identify the payer card based on the bill payer identifier submitted by the bill payee. The PSS can identify the payee card based on the payee account information received in the bill request. Based on the information associated with the payer and payee cards, the PSS can cause funds to be deposited into the bill payee account.

In some embodiments, the PSS transmits a confirmation message to the bill payer to verify whether the bill payer wishes to pay the bill requested by the bill payee. Upon confirmation from the bill payer, the PSS can cause funds to be deposited into the bill payee account substantially instantaneously upon the bill payee's request submitted at the Payee App. In some embodiments, the funds are transferred via a debit transfer. As discussed above, the funds are deposited into the bill payee account using funds held within the payment service account of the PSS, where reimbursement funds are transferred from the bill payer account.

In some embodiments, the bill payer can choose to send a bill request to more than one bill payer. For example, the bill payer is a landlord who wishes to send bill requests for multiple tenants at one or more rental properties. In this example, the bill payee can submit one amount that can be applied to all bill payers, or a different amount for each bill payer. The Payee App can then forward the information to have the bill request processed by the PSS, as discussed above.

Note that while the example scenarios use an email address as an identifier according to some embodiments described above, an identifier other than the email address may be used in other embodiments. The identifier can be any identification information that identifies an individual including, for example, a telephone number, a driver's license number, a social security number, an employee identification number (ID), a device identifier (ID), a mobile application identifier (ID), an IP address, a personal identification number (PIN), a card verification value (CVV), a security access code, a messaging handler (e.g., instant message username, social networking username, etc.), a biometric identifier (e.g., fingerprint, voice, face, iris, retina, heartbeat, etc.) or any other identification means.

Additionally, while a debit card is discussed in the above example scenarios, other payment cards may be used as recognized by one of ordinary skill in the art with the benefit of the present disclosure. The term "payment card," as used in the above examples and throughout the following description, refers to a payment mechanism that includes conventional, a debit card, a conventional credit card, a conventional pre-paid gift card, a "smartcard" that has embedded integrated circuit chips (e.g., a Europay-MasterCard-Visa (EMV) card), a proxy card, or any financial instrument that functions as a combination of any of these mechanisms.

Although the example scenarios above refer to bill payment, the bill payment technology may be implemented for other types of transactions. For example, the technology can be used to transfer funds in a peer-to-peer money transfer (e.g., as a gift, an IOU debt, etc.) Further, while a mobile device is discussed in the above example scenarios in accordance with some embodiments, a computing device other than a mobile device may be utilized in other embodiments (e.g., a desktop or personal computer (PC)). In such embodiments, the mobile application can be replaced by a more conventional software application in such computing device, where such software application has functionality similar to that of the mobile application as described here.

The term "cause" and variations thereof, as used in the preceding paragraph and elsewhere in this description, refers to either direct causation or indirect causation. For example, a computer system can "cause" an action by sending a message to a second computer system that commands, requests or prompts the second computer system to perform the action. Any number of intermediary devices may examine and/or relay the message during this process. In this regard, a device can "cause" an action even though it may not be known to the device whether the action will ultimately be executed or completed.

Various examples of the bill payment technology will now be described in further detail. The following description provides specific details for a thorough understanding and enabling description of these examples. One skilled in the relevant art will understand, however, that the bill payment technology discussed herein may be practiced without many of these details. Likewise, one skilled in the relevant art will also understand that the bill payment technology can include many other obvious features not described in detail herein. Additionally, some well-known structures or functions may not be shown or described in detail below, so as to avoid unnecessarily obscuring the relevant description.

FIG. 1A is a block diagram illustrating an environment 100A in which a bill payment technology can be implemented, in accordance with a first embodiment. The environment 100A includes a user device 104 belonging to a sender 101 and a user device 106 belonging to a recipient 102. Each of the user devices 104, 106 can be, for example, a mobile device such as a smart phone, a tablet computer, a laptop computer, a stationary computing device, such as a conventional personal computer (PC), or any other form of computing device capable of processing capabilities. An application 124 (hereinafter, "App 124") runs, or executes, on the user device 104.

The environment 100 also includes a computer system 110 of a payment service (hereinafter "payment service system (PSS) 110"), a computer system 120 of a financial institution (hereinafter, "financial institution system (FIS) 120"), and a computer system 130 of another financial institution (hereinafter, "financial institution system (FIS) 130"). The FIS 120 can be a computer system of a banking service (e.g., "Bank 1"). The FIS 130 can be a computer system of another banking service (e.g., "Bank 2"). Each of the aforementioned computer systems can be a server computer system that includes one or more distinct physical computers and/or other processing devices which, in the case of multiple devices, can be connected to each other through one or more wired and/or wireless networks.

The aforementioned devices and computer systems are coupled to each other through a network 108, which can be or include the Internet, a wired communications network, or a wireless communications network (e.g., a WiFi network and/or a cellular telecommunications network).

In accordance with some embodiments of the bill payment technology, the sender 101 can initiate a bill payment to the recipient 102 by accessing the App 124 installed on the user device 104. In some embodiments, the App 124 (and its associated functionality) is provided over the network 108 through a browser application, e.g., a website portal accessible via an Internet browser. In some embodiments, the App 124 is a mobile application executed and/or facilitated by the FIS 120. For example, the FIS 120 sends instructions to the App 124 for executing a mobile financial institution application (e.g., "Bank 1 Mobile App") that implements a variety of operations on the user device 104. An example operation is bill payment processing that allows the sender 101 to pay the recipient 102 for a bill owed to the recipient 102.

Upon accessing the App 124, the sender 101 can request the bill payment to be sent to the recipient 102 by inputting, via a user interface of the App 124, an amount and a recipient identifier. In some embodiments, the sender 101 can also input a name of the recipient. Upon receipt, the App 124 can send the amount and the recipient identifier to the FIS 120, which forwards the information to the PSS 110 via an application programming interface 122 ("API 122"). In some embodiments, upon receipt of the information, the App 124 forwards the amount and the recipient identifier directly to the PSS 110 via an API 112.

In some embodiments, the FIS 120 sends, via the API 122, account information about the sender 101 ("sender account information") to the PSS 110, upon receiving the request for bill payment from the sender 101. In some embodiments, the FIS 120 sends the sender account information in response to a request from the PSS 110. The sender account information is a portion of, or an entirety of, the account information the FIS 120 possesses based on the registration of the sender 101 to open a financial account with the FIS 120. In some embodiments, the sender account information is the account information the FIS 120 possesses based on the registration of the sender 101 to access financial services provided through the App 124 by the FIS 120. The sender account information can include a sender name and payment card information associated with a payment card of the sender 101, where the payment card is issued by the financial institution employing the FIS 120. For example, the payment card is a debit card. In some embodiments, the sender account information can include contact information of the sender 101, such as a telephone number. For example, the sender 101 provides the contact telephone number when registering for a financial account with the FIS 120.

In some embodiments, the sender account information can include an enrollment status of the sender 101. The enrollment status indicates whether the sender 101 has enrolled in a direct bill payment service provided by the PSS 110 on behalf of the FIS 120. If the enrollment status is active (i.e., the sender 101 is enrolled), the PSS 110 can proceed to store the sender account information (e.g., email address, telephone number, payment card information, sender name, etc.) in its database for use in the direct bill payment service.

Upon receiving all of the information from the FIS 120 (and/or the App 124), the PSS 110 transmits a message to the recipient 102 by using the recipient identifier. For example, the message is sent to an email address of the recipient 102 as an email message. In another example, the message is sent to a telephone number of the recipient 102 as a text message. The recipient 102 can receive the message at the user device 106. The message is configured to prompt whether the recipient 102 wishes to receive the money (e.g., bill payment amount) from the sender 101. The message can display, for example, the name of the sender 101, the bill payment amount, and a short message (e.g., "Do you want to accept this bill payment from Alex?") If the recipient 102 does not accept, or declines, the bill payment, the PSS 110 notifies the FIS 120 and the bill payment process ends. If the recipient 102 accepts, the PSS 110 continues facilitating the bill payment process.

In some embodiments, upon receiving the acceptance from the recipient 102, the PSS 110 enrolls the recipient 102 into a direct bill payment service. In such embodiments, the enrollment can include storing a variety of information about the recipient 102 and updating an enrollment status of the recipient 102 to "active." The PSS 110 can utilize the variety of information in executing future transactions associated with the direct bill payment service, such as providing a streamlined onboarding process for the recipient 102. For example, the next time another sender (e.g., the sender 101 or a different sender) requests for a bill payment to be transferred to the recipient 102, the funds for the payment are automatically deposited into the recipient account without requiring any further action from the recipient 102 (e.g., accept the money transfer request, setup and/or go through a registration process, etc.).

Referring back to the bill payment process, the PSS 110 can continue by determining a payment account, or financial account, of the recipient ("recipient account") based on the recipient identifier inputted by the sender 101. In some embodiments, the PSS 110 accesses a database, which maintains association data between user identifiers and payment cards, to determine the recipient account. In such embodiments, the PSS 110 uses the recipient identifier as an index into the database. For example, the PSS 110 looks for any match between the recipient identifier and any stored identifier, and identifies any payment card that has been associated with the matching stored identifier.

In some embodiments, the recipient identifier is previously stored in association with the payment card in a past transaction, where the payment card and the recipient identifier have been utilized. In some embodiments, the past transaction is a direct bill payment service executed by the PSS 110 on behalf of another financial institution system, such as the FIS 130, where the PSS 110 operates as a third-party payment processing service for the FIS 130. In some embodiments, the past transaction is a direct bill payment service executed by the PSS 110 on behalf of the recipient 102 via the FIS 120, where the recipient 102, similar to the sender 101, also has an account associated with the FIS 120. In some embodiments, the past transaction is a direct bill payment service executed by the PSS 110 on behalf of the payment service's own customers. For example, the recipient 102 has a payment service customer account associated with the PSS 110.

The PSS 110 may not be able to identify a payment card associated with the recipient identifier (e.g., the recipient 102 has never conducted a transaction with the PSS 110 nor with a system integrated and/or associated with the PSS 110). In some embodiments, the PSS 110 can transmit a message to the recipient 102 to request for payment card information to continue the process. Further details regarding the payment card request will be discussed in reference to FIG. 2.

Upon identification of a payment card of the recipient 102, the PSS 110 can use the payment card information to process the bill payment on behalf of the sender 101. In particular, the PSS 110 can identify, based on the payment card information, the recipient's financial account to be a recipient account 132 associated with the FIS 130. The PSS 110 can then communicate with the FIS 130 to cause monetary funds indicative of the bill payment amount to be transferred to the recipient account 132. Further details regarding how the monetary funds are caused to be transferred will be discussed in reference to FIGS. 4, 5, and 6.

In some embodiments, the sender 101 can send multiple bill payments to multiple recipients. In such embodiments, the sender 101 can input two or more recipient identifiers to identifier the different recipients to whom the sender 101 wishes to send a bill payment. In some embodiments, the sender 101 can input, or specify, different bill payment amounts for the different recipients as identified by the multiple recipient identifiers. In some embodiments, the sender 101 can simply input one bill payment amount that is applied to all of the recipients. For example, the sender 101 can send an amount of $20 to a group of 3 dog-walkers as payment for dog-walking service provided by each dog-walker.

Figure 1B:
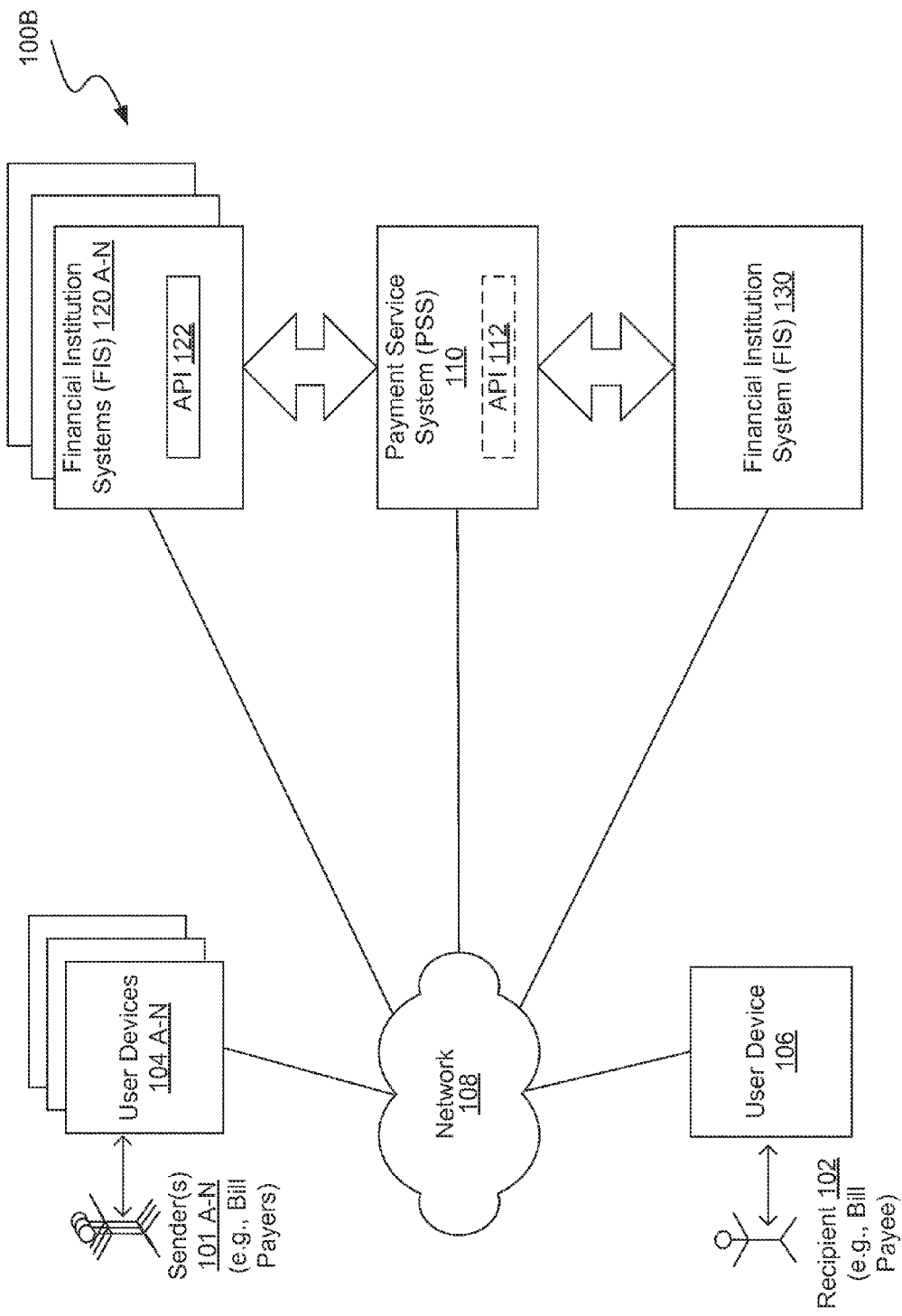

FIG. 1B is a block diagram illustrating an environment 100B in which a bill payment technology can be implemented, in accordance with a second embodiment. The environment 100B, similar to the environment 100A of FIG. 1A, includes the user device 106 belonging to the recipient 102, the PSS 110, the FIS 130, and the network 108. In accordance with the second embodiment, the environment 100B also includes two or more user devices 104 A-N (where A is an integer of 1 and N is an integer greater than 1) belonging to two or more senders 101 A-N, and two or more FIS 120 A-N. An application (e.g., a mobile banking application or a browser application) can be installed to execute, or run, on the user devices 104 A-N, respectively.

In accordance with the embodiment of FIG. 1B, the PSS 110 can facilitate, or process, bill payments on behalf of two or more senders 101 A-N who have financial accounts associated with the FIS 120 A-N, respectively. The PSS 110 can receive two or more requests to process a bill payment from the FIS 120 A-N (e.g., via the API 122 of each respective FIS 120 A-N or via the API 112), and can process the requests for the senders 101 A-N on behalf of the FIS 120 A-N.

Consider a first example scenario where a "Sender X" and a "Sender Y" utilize their respective user device 104 to submit a bill payment request to a respective FIS 120 (e.g., "Bank X" associated with the Sender X and "Bank Y" associated with Sender Y). Sender X submits information to an FIS, such as one from the FIS 120 A-N (e.g., "FIS X"), to initiate a bill payment to the recipient 102, e.g., "Recipient Z." For example, the Sender X, using an Internet browser installed on Sender X's personal computer, accesses a website to input an identifier (e.g., an email address) of a bill payment recipient (e.g., "Recipient Z") and a bill payment amount of $15. The website is executed, for example, by FIS X working in coordination with the PSS 110.

Sender Y, separately from the Sender X, submits information to another FIS, such as one from the FIS 120 A-N (e.g., "FIS Y"), to initiate a bill payment to the same recipient, e.g., Recipient Z. For example, Sender Y accesses a mobile banking application installed on Sender Y's smartphone to input the same email address to identify Recipient Z and a bill payment amount of $10. The mobile banking application is executed, for example, by FIS Y working in coordination with the PSS 110.

The PSS 110 receives the information associated with Sender X's request and Sender Y's request from FIS X and FIS Y, respectively. The PSS 110 can determine, based on the identifier submitted in each request, that the bill payments are requested for the same individual, e.g., Recipient Z. In response to this determination, the PSS 110 can aggregate the requests, based on the identifier, to calculate an accumulated bill payment amount. The PSS 110 then causes funds indicative of the accumulated bill payment amount to be deposited into a financial account associated with the recipient 102, e.g., Recipient Z.

Figure 1C:
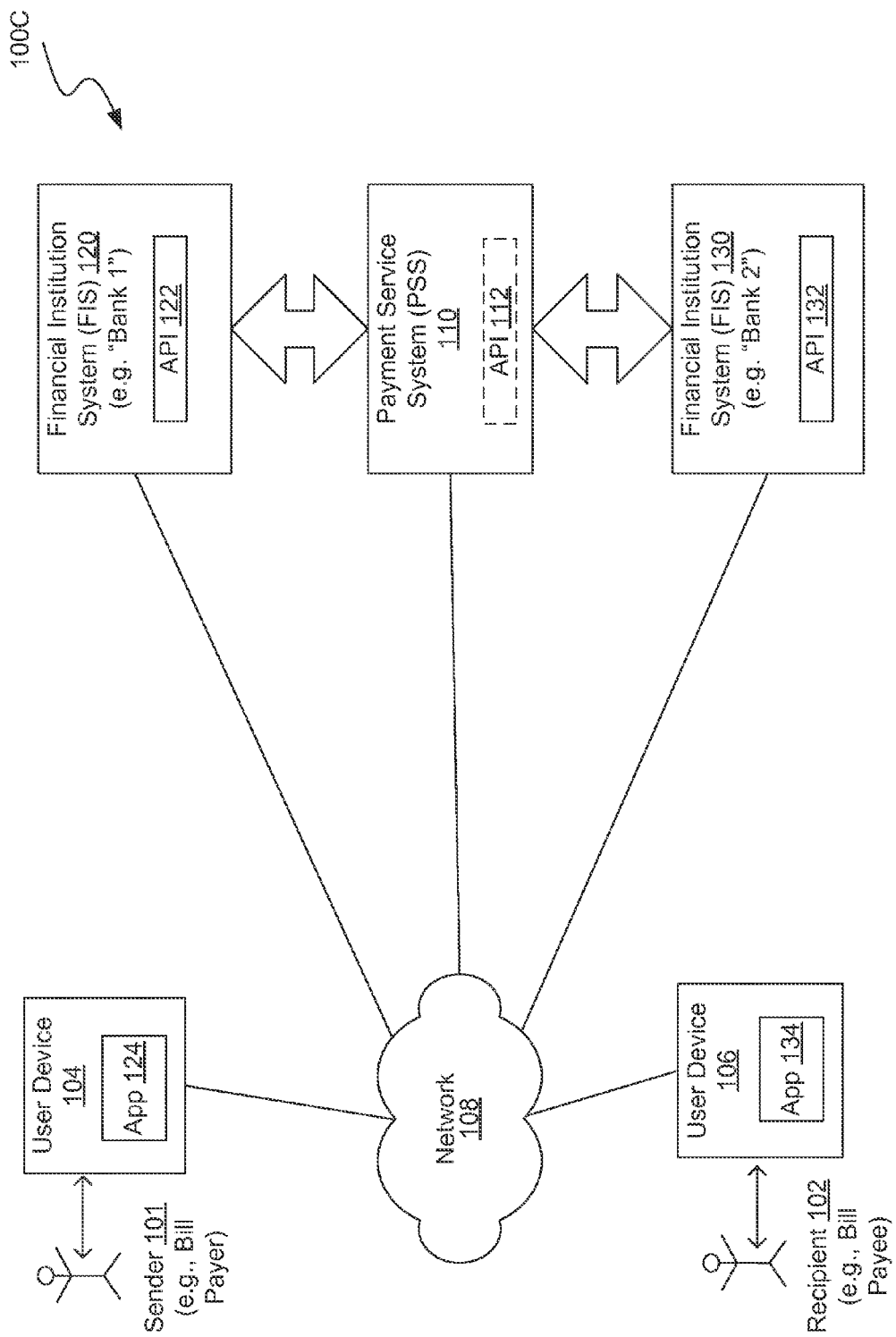

FIG. 1C is a block diagram illustrating an environment 100C in which a bill payment technology can be implemented, in accordance with a third embodiment. The environment 100C, similar to the environment 100A of FIG. 1A, includes the user device 104 belonging to the sender 101, the user device 106 belonging to the recipient 102, the PSS 110, the FIS 120, the FIS 130, and the network 108. In accordance with the third embodiment of FIG. 1C, the user device 106 includes an application 134 ("App 134") and the FIS 130 includes an application programming interface 132 ("API 132").

The API 132 enables communication between the FIS 130 and the PSS 110. For example, the API 132 handles requests from the PSS 110 to execute one or more operations, e.g., a data retrieval operation to forward, to the PSS 110, inputs that are received at the FIS 130 from the recipient 102 (e.g., via the user device 106). In some embodiments, the PSS 110 can include an API 112 to interact with the API 132 for handling one or more requests from the FIS 130. An example request can be to determine payment card information that is associated with an input, such as a recipient identifier, received by the FIS 130 from the sender 101, where the payment card information is stored in association with the recipient identifier in a database associated with the PSS 110.

In some embodiments, the API 132 also enables communication between the FIS 130 and the App 134. For example, the API 132 handles requests from the App 134 to execute one or more operations, e.g., a data storage operation to store, at a database associated with the FIS 130, inputs received from the recipient 102 via the user device 106.

The App 134 can be a mobile application or a conventional software application. In some embodiments, the App 134 (and its associated functionality) is provided over the network 108 through a browser application, e.g., a website portal accessible via an Internet browser, where the website portal is executed and/or facilitated by the FIS 130. In some embodiments, the App 134 is a mobile application executed and/or facilitated by the FIS 130.

In some embodiments, the recipient 102 can utilize the App 134 to initiate a bill payment process, where the recipient 102, as opposed to the sender 101, requests monetary funds (e.g., a bill payment amount) from the sender 101. In such embodiments, the FIS 130 is integrated with the PSS 110, which facilitates a direct bill payment service on behalf of customers, or users, of the financial institution employing the FIS 130. The App 134, in such embodiments, can provide similar functionality as the App 124 executed by the FIS 120. The recipient 102 can initiate the bill payment process by inputtin a sender identifier and a request amount via the App 134. For example, the recipient 102 is a hairdresser who wants to request a bill payment amount of $80 from the sender 101 for hair service provided by the recipient 102.

Upon receipt, the App 134 transmits the sender identifier and the request amount to the FIS 130, which forwards the information to the PSS 110. The FIS 130 can forward the information to the PSS 110 using the API 132. In some embodiments, the API 132 can be similar in functionality to the API 122, where the API 132 is integrated with the PSS 110. In some embodiments, the App 134 (as opposed to the FIS 130 via the API 132) directly transmits the sender identifier and the request amount to the PSS 110. In such embodiments, the App 134 can be executed and/or facilitated by the PSS 110 working in coordination with the FIS 130.

In some embodiments, the FIS 130 (via the API 132) transmits account information about the recipient to the PSS 110 ("recipient account information"). In some embodiments, the FIS 130 sends the recipient account information in response to a request from the PSS 110. The recipient account information is a portion of, or an entirety of, the account information the FIS 130 possesses based on the registration of the recipient 102 to open a financial account with the FIS 130. In some embodiments, the recipient account information is the account information the FIS 130 possesses based on the registration of the recipient 102 to access financial services provided through the App 134 by the FIS 130. The recipient account information can include a recipient name and payment card information associated with a payment card of the recipient 102, where the payment card is issued by the financial institution employing the FIS 130. For example, the payment card is a debit card issued by, e.g., "Bank 2". In some embodiments, the recipient account information can include contact information of the recipient 102, such as a telephone number. For example, the recipient 102 provides the telephone number as a form of contact when registering with the FIS 120.

In some embodiments, the recipient account information can include an enrollment status of the recipient 102. As discussed above, the enrollment status indicates whether a particular individual has enrolled in a direct bill payment service provided by the PSS 110 (either directly or indirectly on behalf of a financial institution). In accordance with the embodiment of FIG. 1C, the enrollment status of the recipient 102 is active; according to the embodiment, the enrollment status has been updated when the recipient 102 accepts to receive a bill payment from the sender 101 (e.g., as discussed in reference to FIG. 1A).

Upon receiving all of the information from the FIS 130 (and/or the App 134), the PSS 110 determines whether the sender 101, as identified by the sender identifier, is enrolled in the direct bill payment service. In particular, the PSS 110 accesses a database to determine if the sender identifier is associated with an enrollment status of "active," indicating the sender 101 is enrolled to receive funds directly without any further action needed from the sender 101 (e.g., accept, register, etc.). If the PSS 110 identifies that the enrollment status is active, the PSS 110 causes monetary funds to be deposited into the financial account of the recipient 102, as requested by the recipient 102 in the request submitted via the App 134. Further details regarding the transfer of funds for the bill payment will be discussed with reference to FIGS. 4, 5, and 6.

If the PSS 110 identifies that the enrollment status is inactive and/or does not exist in the database, the PSS 110 can transmit a message to the sender 101 by using the sender identifier. For example, the PSS 110 transmits an email message to the sender 101 if the sender identifier is an email address. In another example, the PSS 110 transmits a text message to the sender 101 if the sender identifier is a telephone number. The message can be configured to prompt the sender 101 to accept the request for a bill payment from the recipient 102. In some embodiments, the message can be configured to prompt the sender 101 to submit payment card information associated with a payment card of the sender 101 to enable the bill payment process. In such embodiments, the PSS 110 can determine whether the payment card information associated with the sender 101 is available, and based on that information, determine whether the payment card is valid. If the payment card is valid, the PSS 110 can proceed to cause funds to be transferred out of a financial account associated with the payment card of the sender 101 for the bill payment process. Further details regarding the transfer of funds for the bill payment will be discussed with reference to FIGS. 4, 5, and 6.

In some embodiments, the recipient 102 can send multiple requests for bill payments to multiple senders. In such embodiments, the recipient 102 can input two or more sender identifiers to identifier the different senders from whom the recipient 102 wishes to request a bill payment. In some embodiments, the recipient 102 can input, or specify, different bill payment request amounts for the multiple senders (as identified by the multiple sender identifiers). For example, the recipient 102 can input an amount of $50 for "Sender X" with sender identifier X and an amount of $20 for "Sender Y" with sender identifier Y for dog-walking services provided to Sender X and Sender Y, respectively. In some embodiments, the recipient 102 can simply input one bill payment request amount that is applied to all of the senders. For example, the recipient 102 can input a single amount of $50 that gets applied to each recipient, where the $50 serves as a payment by each sender to the recipient 102, e.g., for a three-course meal prepared by the recipient 102 for a group of senders.

Figure 2:
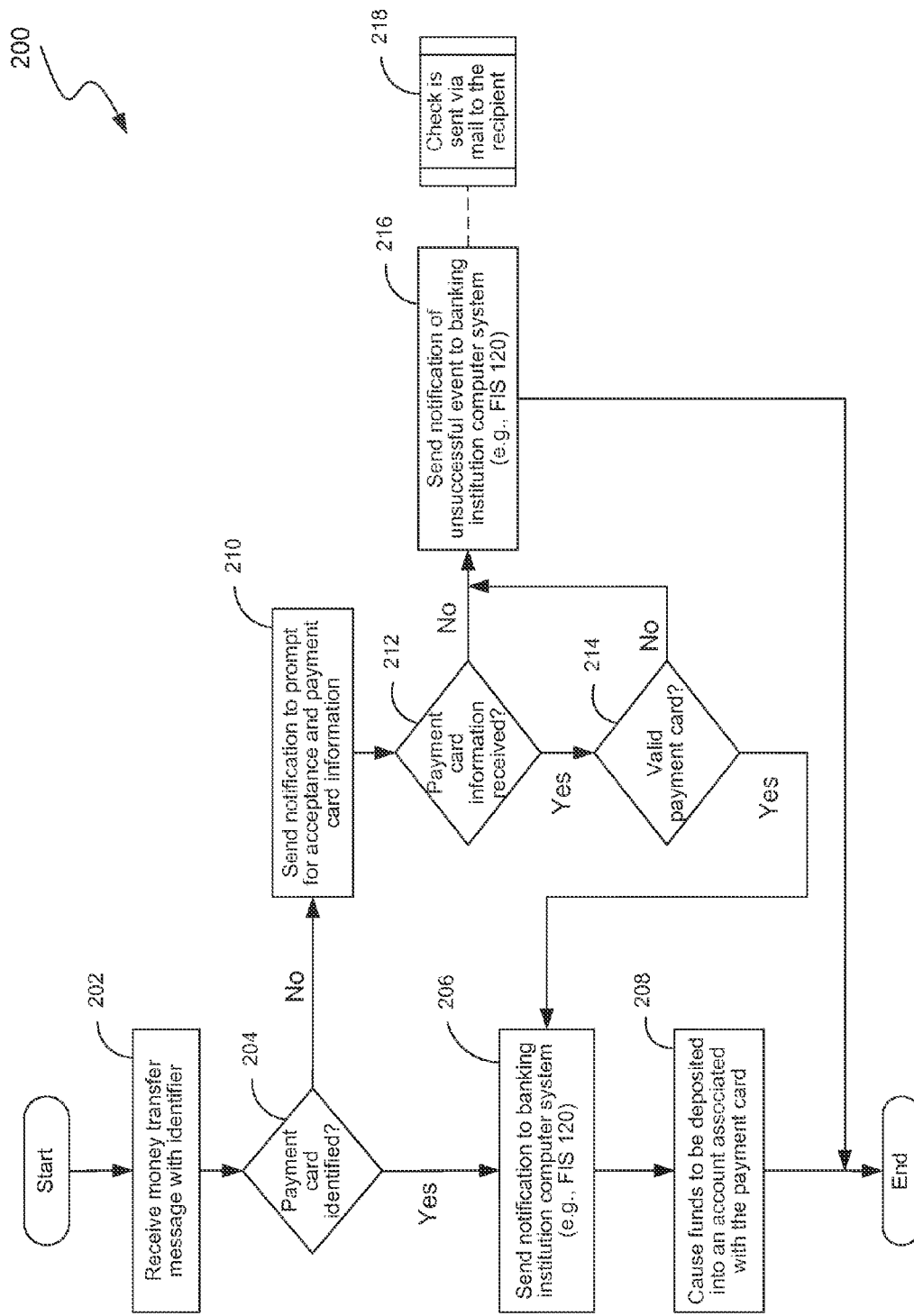
FIG. 2 is a flow diagram illustrating an example process of transferring monetary funds associated with a bill payment.

FIG. 2 is an example process 200 of transferring money associated with a bill payment, according to some embodiments of the bill payment technology. In accordance with some embodiments of the bill payment technology, the process 200 can be implemented by the PSS 110 of FIG. 1, which facilitates a direct bill payment service for customers of one or more financial institutions.

For ease of discussion of the process 200, consider a scenario in which a bill payer launches a mobile banking application on the bill payer's mobile device, where the mobile banking application is executed by a server computer system of the bill payer's banking institution. In this scenario, the bill payer can initiate a bill payment process to send money to a bill payee by submitting, via the mobile banking application, information related to the bill payee ("bill payee information"). The bill payee information can include the bill payee's name, a payee identifier, and an amount indicating how much the bill payer wants to send to the bill payee as payment for a bill (e.g., money owed to the bill payee for a service or product). The mobile banking application forwards the submitted name, identifier, and amount to the server computer system of the banking institution (e.g., FIS 120 of FIG. 1). The server computer system forwards the submitted information, or data, along with additional data about the bill payer to the PSS 110, which proceeds to process the bill payment request from the bill payer on behalf of the banking institution. In some embodiments, the data can be sent from the server computer system of the banking institution via an API associated with the PSS 110.

Based on the scenario discussed above, the process 200 starts at block 202 where the PSS 110 receives a money transfer message from the server computer system of the bill payer's banking institution. The money transfer message includes at least the submitted identifier and amount. In some embodiments, the money transfer message also includes the bill payee's name. In some embodiments, the money transfer message also includes sender account information (i.e., information possessed by the banking institution about the sender). The sender account information can include payment card information associated with a payment card of the bill payer, where the payment card is issued by the bill payer's banking institution. The PSS 110 can utilize the payment card information to cause funds to be transferred to the bill payee's financial account, as will be discussed in further details with reference to FIGS. 4, 5, and 6.

At decision block 204, the PSS 110 determines whether it can identify a payment card by using the submitted identifier. As discussed above, the payment card can be identified based on a previously stored association between the payment card and the identifier, where the association is created when the payment card is used along with the identifier in a past transaction with the PSS 110. The PSS 110 can use the identified payment card to identify a financial account associated with the card to transfer funds for the bill payment. If the payment card is found, the process 200 continues to block 206.

At block 206, the PSS 110 sends a notification to the banking institution server computer system (e.g., FIS 120). In some embodiments, the notification can indicate that the recipient has been identified based on the submitted identifier, and that funds for the bill payment will be sent substantially instantly. In such embodiments, the notification enables the bill payer to see that the bill payment is processed right away, as opposed to taking, e.g., 2-3 days for processing under traditional bill payment processing (e.g., via an ACH transfer).

At block 208, the PSS 110 causes funds to be deposited, or transferred, directly into a financial account associated with the identified payment card. In some embodiments, PSS 110 can cause the funds to be deposited into the bill payee's financial account by a debit-to-debit transfer between the bill payer's debit card account and the bill payee's debit card account. In some embodiments, the PSS 110 can cause the funds to be deposited into the bill payee's financial account by a debit transfer between a debit card account associated with the PSS 110 and the bill payee's debit card account. In such embodiments, the PSS 110 can be reimbursed for the funds from the bill payer by an ACH transfer. In some embodiments, the PSS 110 can be reimbursed for the funds from the bill payer by a ledger entry adjustment. Further details regarding the transfer of funds for the bill payment will be discussed in reference to FIGS. 4, 5, and 6.

Referring back to decision block 204, if the PSS 110 is unable to identify a payment card based on the submitted identifier, the process 200 proceeds to block 210. At block 210, the PSS 110 sends a notification to the bill payee about the bill payment. In some embodiments, the notification is sent using the submitted identifier. For example, if the identifier is an email address, the notification is sent as an email message to the bill payee. In another example, if the identifier is a phone number, the notification is sent as a text message to the bill payee. The notification can include a message to prompt the bill payee to accept the bill payment from the bill payer by submitting payment card information. In some embodiments, the message includes a link that redirects the bill payee to a landing page (e.g., a website portal) that enables the bill payee to submit the payment card information. In some embodiments, the message simply prompts the bill payee to submit the payment card information by replying to the message (e.g., by replying to a text message or an email message).

At decision block 212, the PSS 110 determines whether it has received the payment card information from the bill payee. If the payment card information is not received, the process 200 proceeds to block 216, which will be discussed further below. In some embodiments, at decision block 212, the PSS 110 waits for a predefined time period (e.g., 10 minutes, 24 hours, 72 hours, a week, etc.) for the bill payee to submit the payment card information. In such embodiments, upon expiration of the predefined time period (i.e., where the time period incrementally decreases to zero with the passage of time), the PSS 110 proceeds to step 216 if no payment card information is received from the bill payee. In some embodiments, the PSS 110 resend the notification of the bill payment (e.g., a reminder notification) to the bill payee (e.g., block 210 is repeated) if no payment card information is received within a predefined sub time period. For example, the waiting time period is predefined to be 72 hours (or 3 days) and the sub time period is predefined to be 24 hours (or 1 day). In this example, the PSS 110 would send a reminder notification to the bill payee every day within the 3-day period until the bill payee submits the payment card information to accept the bill payment.

Referring back to decision block 212, if the payment card information is received, the process 200 proceeds to block 214. At block 214, the PSS 110 determines whether the payment card is valid. For example, the payment card is invalid if the PSS 110 determines that the payment card, based on the expiration date included in the payment card information, has expired. In another example, the payment card is invalid if the PSS 110 determines that the card verification value (CVV) is invalid (e.g., the CVV does not exist or match with the payment card number). In yet another example, the payment card is invalid if the PSS 110 determines that the payment card number is invalid (e.g., the card number does not exist). If the payment card is invalid, the process 200 continues to block 216, as will be discussed in further details below. If the payment card is valid, the process 200 continues to block 206 and 208, as discussed above.

At block 216, the PSS 110 can generate and transmit a notification that indicates that an unsuccessful event associated with the bill payment has occurred. In one example, the unsuccessful event is a determination that the payment card is invalid, as discussed with respect to block 214. In another example, the unsuccessful event is a determination that the predefined time period for submitting the payment card information has expired, as discussed with respect to block 212. In yet another example, the unsuccessful event is a determination that no payment card information has been submitted (with no reference to expiration of time period), as discussed with respect to block 212.

In some embodiments, the notification of the unsuccessful event is configured to cause the banking institution server computer system to send or trigger sending of a paper check to the bill payee, as indicated in block 218. In such embodiments, the banking institution server computer system, upon receiving the notification from the PSS 110, can transmit a message to request a mailing address of the bill payee from the bill payer. In some embodiments, the banking institution server computer system automatically sends the check to the bill payee. In such embodiments, the mobile banking application of the banking institution server computer system has already requested the bill payer to submit, or input, the bill payee mailing address at the same time that the bill payer submits the bill payee identifier. Note that block 218 operates as a subroutine, and upon completion of the subroutine, the process 200 returns to block 216.

In some embodiments, the process 200 includes an additional execution block prior to block 210. In such embodiments, prior to sending a notification for submission of the payment card information, the PSS 110 sends a notification requesting verification of the bill payee identity (i.e., to verify that the notification recipient is indeed the bill payee to whom the bill payer wishes to send money). The notification requesting verification can be, for example, a text message that prompts the bill payee to verify through a reply text (e.g., "Yes, I confirm."). In another example, the notification can be an email message that prompts the bill payee to verify through a reply email.

Figure 3:
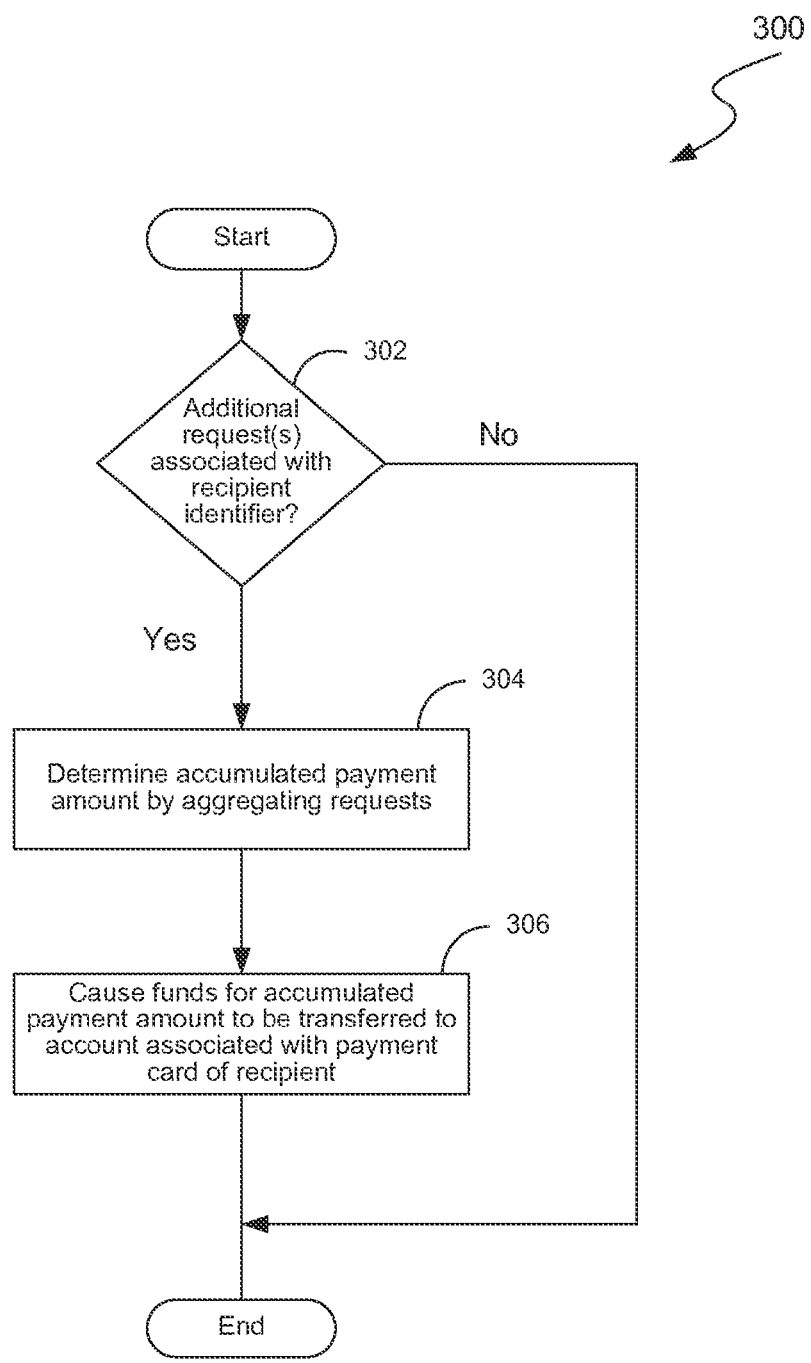
FIG. 3 is a flow diagram illustrating an example process of transferring an accumulated monetary amount associated with an aggregated bill payment.

FIG. 3 is an example process 300 of transferring an accumulated money amount associated with an aggregated bill payment, according to some embodiments of the bill payment technology. The process 300 can be implemented by the PSS 110 of FIG. 1 in conjunction with the process 200 of FIG. 2, in accordance with some embodiments. In some embodiments, the process 300 begins subsequent to the sequence of blocks 202, 204, and 206. In some embodiments, the process 300 begins subsequent to the sequence of blocks 202, 204, 210, 212, and 214 of the process 200. In some embodiments, the process 300 begins prior to block 208 of the process 200.

Referring to the process 300, at block 302, the PSS 110 determines whether there is any additional request(s) for bill payment that includes the identifier of the recipient, or bill payee. For example, a bill payee X provides dog-walking service to more than one individuals, e.g., bill payer Y and bill payer Z, where each desires to pay the bill payee X for that service using the bill payment technology. In this example, the bill payer Y accesses a mobile banking application on the bill payer Y's smartphone to initiate the bill payment to bill payee X, where the mobile banking application is associated with the PSS 110 (e.g., the mobile banking application is executed by a financial institution that works in coordination with the PSS 110). The bill payer Z, separately from the bill payer Y, accesses a website using an Internet browser installed on the bill payer Z's desktop computer to initiate a bill payment to the bill payee X, where the website is executed by a financial institution that works in coordination with the PSS 110. The financial institution of bill payer Z ("financial institution Z") can be the same or a different financial institution that bill payer X utilizes ("financial institution X"). For example, the financial institution Z is a credit union while the financial institution X is a commercial bank. In another example, the financial institution Z is a small, local commercial bank while the financial institution X is an international commercial bank.

The bill payer Y and the bill payer Z can each go through the scenario described in FIG. 2 to request that a bill payment be sent to the bill payee, or recipient, by submitting the identifier and a bill payment amount. For example, the bill payer Y inputs, via the mobile banking application of financial institution Y, an amount of $50 (e.g., to pay for a week's worth of service), and the bill payer Z inputs, via the website portal of financial institution Z, an amount of $10 (e.g., to pay for a day's worth of service).

According to the example above, the PSS 110 can first receive the bill payer Z's bill payment request ("bill payment Z request") from the financial institution Z. Once the PSS 110 has identified (or received) the bill payee X's payment card for the bill payment Z request (e.g., block 206 of FIG. 2), the PSS 110 can determine if any additional bill payment requests has been submitted for the bill payee X, as indicated in decision block 302. At decision block 302, if no additional bill payment request is determined, the process 300 ends. The PSS 110 can proceed, for example, to block 208 of FIG. 2, to finish processing the bill payment Z request.

At decision block 302, if an additional bill payment request is determined, the process 300 continues to block 304. For example, the PSS 110 receives the bill payer Y's bill payment request ("bill payment Y request") from the financial institution Y (and/or the mobile banking application). At block 304, the PSS 110 can, for example, determine an accumulated payment amount that should be sent to the bill payee X. In particular, the PSS 110 can aggregate all of the requests associated with the bill payee X's identifier and add the individual payment amounts. For example, the PSS 110 aggregates bill payment Y request and bill payment Z request and determines the total payment amount to bill payee X to be $60 (e.g., $50+$10).

At block 306, the PSS 110 causes funds to be deposited, or transferred, directly into a financial account associated with the identified payment card of the recipient (e.g., bill payee X). In particular, the funds are for the accumulated payment amount determined in block 304. For example, instead of individual payments (e.g., $10 and $50), the bill payee X would receive a "lump" sum of $60. In some embodiments, the PSS 110 can provide, for the recipient, a record associated with the accumulated payment amount, where the record can show a breakdown of the individual bill payment amount, such as details about each bill payer and associated bill payment. The record can be generated and transmitted to the recipient via an email message, via a text message, via a mobile application associated with the PSS 110, or via a website associated with the PSS 110.

Note that at block 306, the PSS 110 can cause the funds to be deposited into the recipient's financial account by using various transfer mechanisms. For example, the PSS 110 can cause the funds to be deposited by a debit-to-debit transfer between each bill payer's debit card account and the bill payee's debit card account, or by a debit transfer between a debit card account associated with the PSS 110 and the bill payee's debit card account. Further details regarding the transfer of funds for the accumulated bill payment will be discussed in reference to FIGS. 4, 5, and 6.

Regarding the processes 200 and 300, while the various steps, blocks or sub-processes are presented in a given order, alternative embodiments can perform routines having steps, or employ systems having steps, blocks or sub-processes, in a different order, and some steps, sub-processes or blocks can be deleted, moved, added, subdivided, combined, and/or modified to provide alternative or sub-combinations. Each of these steps, blocks or sub-processes can be implemented in a variety of different ways. Also, while steps, sub-processes or blocks are at times shown as being performed in series, some steps, sub-processes or blocks can instead be performed in parallel, or can be performed at different times as will be recognized by a person of ordinary skill in the art. Further any specific numbers noted herein are only examples: alternative implementations can employ differing values or ranges.

Figure 4A:
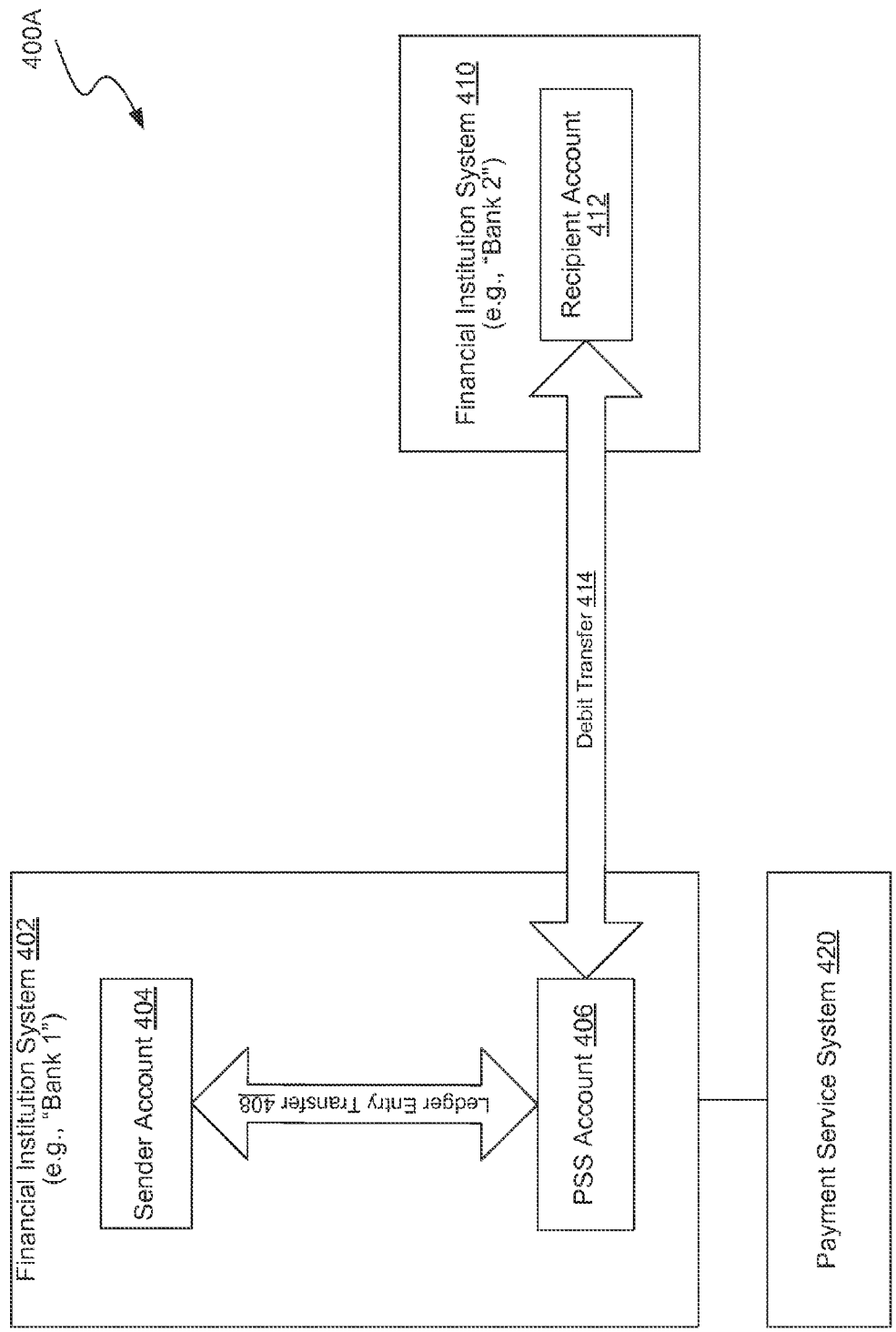
FIGS. 4A and 4B are block diagrams illustrating a payment service system facilitating a funds transfer associated with a bill payment according to a first embodiment.

FIG. 4A is an environment 400A in which a payment service system 420 facilitates a money transfer associated with a bill payment according to a first embodiment. The environment 400 includes a financial institution system 402 ("FIS 402"), a financial institution system 410 ("FIS 410"), and the payment service system 420 ("PSS 420"). According to some embodiments, the FIS 402 can be the FIS 120 of FIG. 1, the FIS 410 can be the FIS 130 of FIG. 1, and the PSS 420 can be the PSS 110 of FIG. 1. The PSS 420 facilitates a direct bill payment service on behalf of various parties, such as customers of the PSS 420, customers of the FIS 402 (e.g., a sender of money or bill payer), and/or customers of the FIS 410 (e.g., a recipient of money or bill payee). The PSS 420 can communicate with the FIS 402 and the FIS 410 over a wired or wireless communications network.

In accordance to the embodiment of FIG. 4A, the FIS 402 includes a sender financial account 404 ("sender account 404") and a payment service system account 406 ("PSS account 406"). The sender account 404 can be a financial account facilitated by, or associated with, the FIS 402, which can be, for example, a commercial bank (e.g., Bank 1"). The sender account 404 is, for example, a banking account that belongs to, or associated with, a sender of money, such as a bill payer who has opened the banking account with Bank 1. Similar to the sender account 404, the PSS account 406 can be a financial account facilitated by, or associated with, the FIS 402. The PSS account 406 is, for example, another banking account that belongs to, or is associated with, the PSS 420.

In accordance to the embodiment of FIG. 4A, the FIS 410 includes a recipient financial account 412 ("recipient account 412"). The recipient account 412 can be a financial account facilitated by, or associated with, the FIS 410, which can be, for example, another commercial bank (e.g., Bank 2"). For example, the recipient account 412 is a banking account that belongs to, or associated with, a recipient of money, such as a bill payee who has opened the banking account with Bank 2.

In a direct bill payment service, the PSS 420 can process one or more bill payments on behalf of the FIS 402. In particular, upon receiving an identifier of the money recipient and the recipient's payment card information (e.g., debit card number, CVV, expiration date, etc.), the PSS 420 can communicate with the FIS 402 to cause at least two operations to occur. First, the PSS 420 can cause monetary funds to be transferred from the PSS account 406 to the recipient account 412 via a debit transfer 414, which results in the money being substantially instantaneously deposited into the recipient account 412.

Second, the PSS 420 can cause monetary funds to be transferred from the sender account 404 to the PSS account 406. In particular, the PSS 420 can cause the transfer by communicating with the FIS 402 to execute a ledger entry transfer 408. The ledger entry transfer 408 is a transfer of funds that results from a ledger entry adjustment executed within an internal database of the FIS 402. For example, in response to the communication from the PSS 110, the FIS 402 updates its database to reflect that the sender account 404 has −$25 (i.e., $25 less in account balance) and the PSS account 406 has +$25 (i.e., $25 more in account balance). In this example, the update indicates that $25 has been transferred from the sender account 404 to the PSS account 406.

In some embodiments, the PSS 420 causes the transfer prior to the debit transfer 414. In such embodiments, the PSS 420 utilizes the funds deposited in the PSS account 406 to transfer over to the recipient account 412. In some embodiments, the PSS 420 causes the ledger entry transfer 408 after it causes the debit transfer 414. In such embodiments, the funds that get deposited into the PSS account 406 is a reimbursement for the funds that the PSS 420 deposits into the recipient account 412 on behalf of the FIS 402 (and the sender of the sender account 404).

In some embodiments, the PSS 420 causes the ledger entry transfer 408 to occur at the same time as it causes the debit transfer 414 to occur. In such embodiments, the funds from the sender account 404 may be deposited into the PSS account 406 after or before the PSS 420 has caused the debit transfer 414, depending on the operations facilitated by the FIS 402. For example, the FIS 402 may schedule all ledger entry transfers to be executed at midnight every day, but the sender, however, may submit the request to send money to the recipient at 9 AM. In this example, the PSS 420 may cause the funds to be transferred from the PSS account 406 to the recipient account 412 right away in order to provide fast, efficient service; the PSS 420 would receive the funds from the sender account 404 at a later time (e.g., at midnight via the FIS 402), as a reimbursement for the funds that have been transferred to the recipient account 412. In another example, the FIS 402 may schedule all ledger entry transfers to be executed within a short time period of being notified or requested by the PSS 420 (e.g., 30 seconds, 5 minutes, 15 minutes, 60 minutes, etc.). In this example, the PSS 420 would receive the funds from the sender account 404 to be deposited into the PSS account 406 substantially instantaneously, upon having requested those funds from the FIS 402; the PSS 420 would then transfer the received funds (deposited in the PSS account 406) to the recipient account 412 by a debit-to-debit transfer.

Figure 4B:
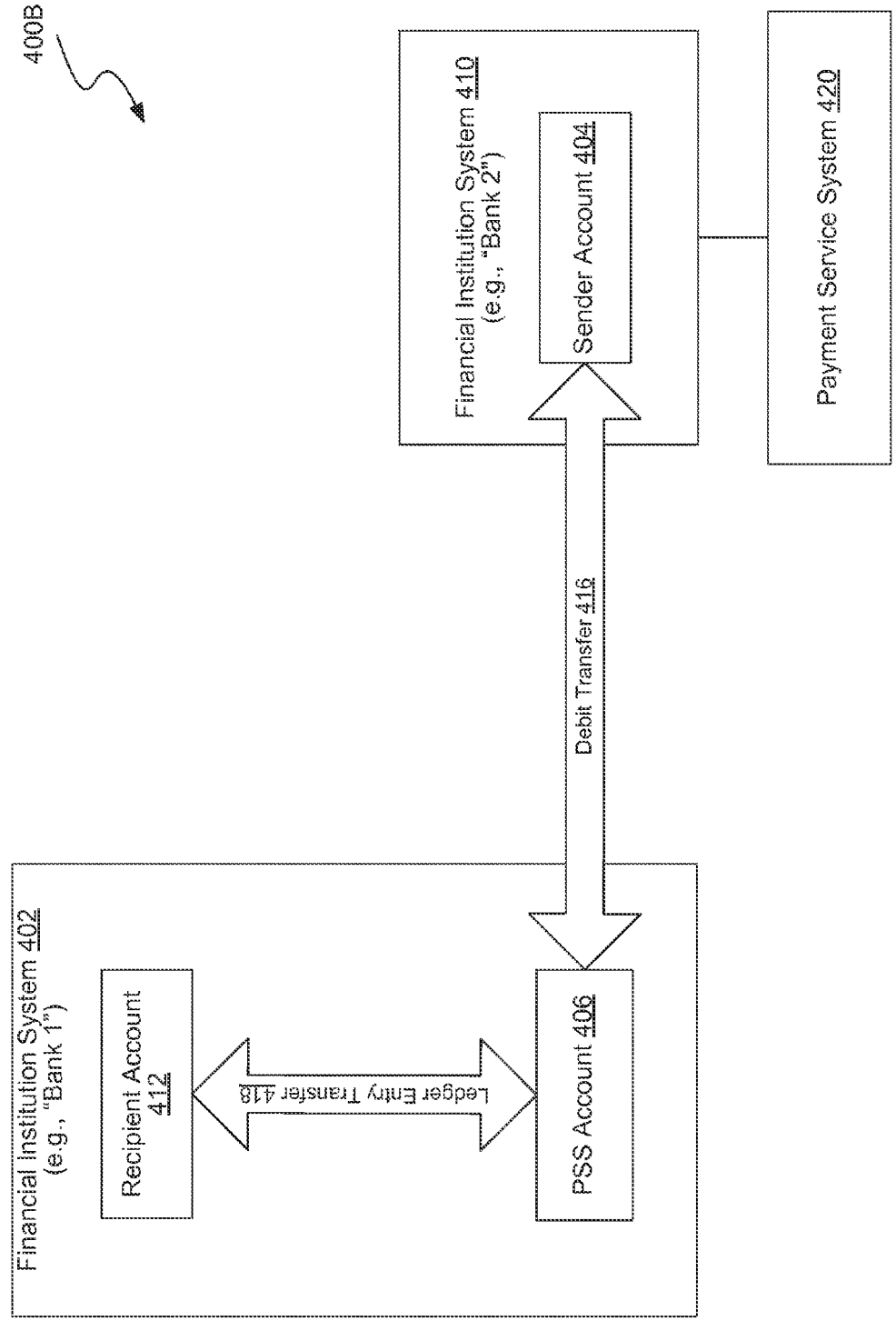

FIG. 4B is an environment 400B in which the PSS 420 facilitates a "reverse" money transfer associated with a bill payment in accordance with some embodiments. In the embodiments illustrated in FIG. 4B, the PSS 420 is associated, or integrated, with the FIS 410 and the FIS 410 is associated with the sender (as opposed to the recipient as described in the previous embodiments illustrated in FIG. 4A). Accordingly, in these embodiments, the sender account 404 is facilitated by the FIS 410, while the PSS account 406 and the recipient account 412 are facilitated by the FIS 402. In accordance with the embodiments of FIG. 4B, the PSS 420 can process one or more bill payments on behalf of the FIS 410 to enable the sender to make one or more payments to the recipient with the receipient account at the FIS 402. The transaction flow in such embodiments involves a transfer of money via debit rails (i.e., a debit transfer 416) to transfer funds from the sender account 404 into the PSS account 406, and a transfer of money via a ledger entry adjustment (i.e., ledger entry transfer 418) from the PSS account 406 into the recipient account 412. As a result, the bill payment amount gets transferred substantially instantaneously upon the sender's request submitted via a mobile application that is associated with the FIS 410.

Figure 5:
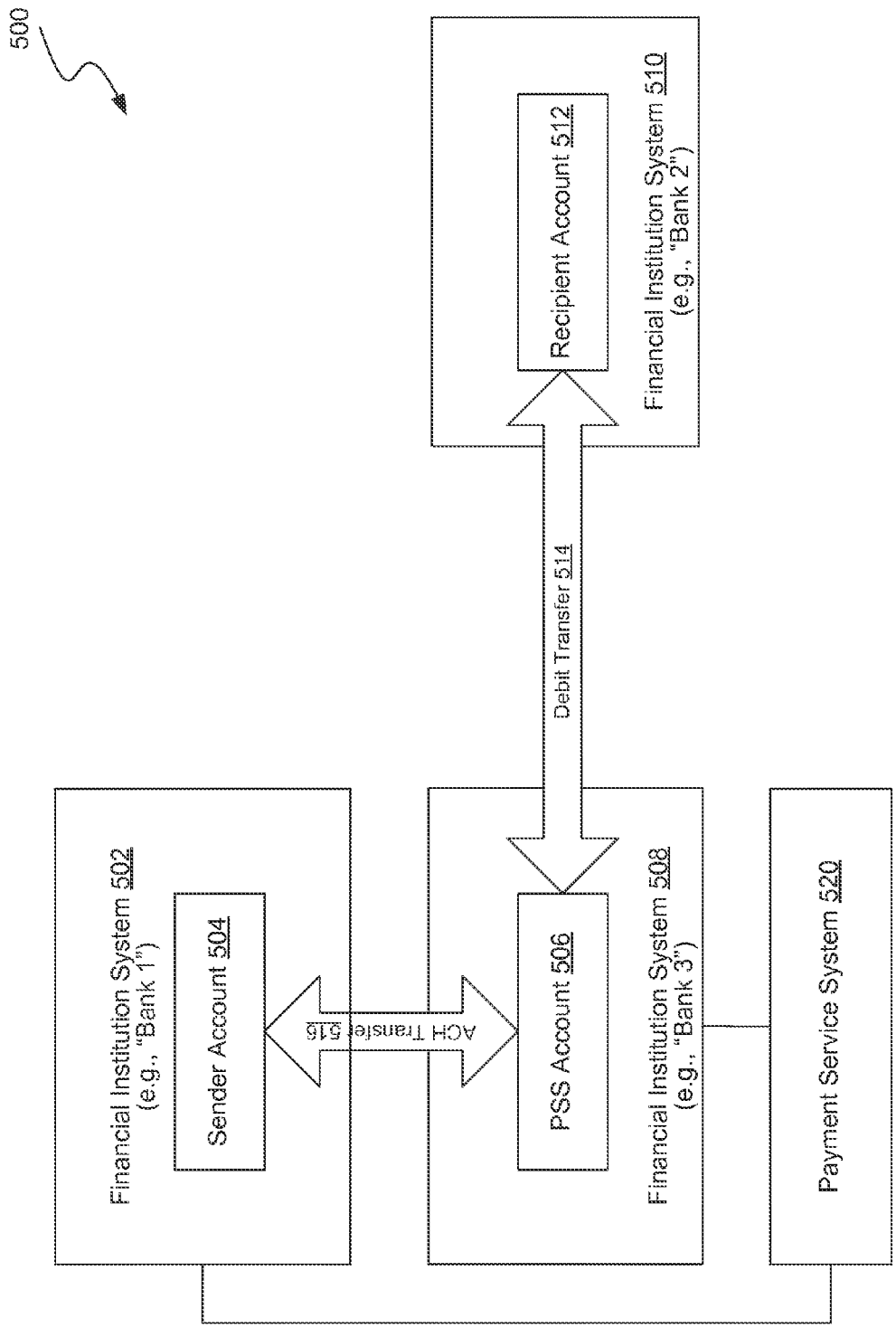
FIG. 5 is a block diagram illustrating a payment service system facilitating a funds transfer associated with a bill payment according to a second embodiment.

FIG. 5 is an environment 500 in which a payment service system 520 facilitates a money transfer associated with a bill payment according to a second embodiment. The environment 500 includes a financial institution system 502 ("FIS 502"), a financial institution system 510 ("FIS 510"), and the payment service system 520 ("PSS 520"). According to some embodiments, the FIS 502 can be the FIS 120 of FIG. 1, the FIS 510 can be the FIS 130 of FIG. 1, and the PSS 520 can be the PSS 110 of FIG. 1. The PSS 520 facilitates a direct bill payment service on behalf of various parties, such as customers of the PSS 520, customers of the FIS 502 (e.g., a sender of money or bill payer), and/or customers of the FIS 510 (e.g., a recipient of money or bill payee). The environment 500 also includes a financial institution system 508 ("FIS 508") that is associated with the PSS 520. The PSS 520 can communicate with the FIS 502, the FIS 508, and the FIS 510 over a wired or wireless communications network.

In accordance with the embodiment of FIG. 5, the FIS 502 includes a sender financial account 504 ("sender account 504"). The sender account 504 can be a financial account facilitated by, or associated with, the FIS 402, which can be, for example, a commercial bank (e.g., "Bank 1"). The sender account 504 is, for example, a banking account that belongs to, or associated with, a sender of money, such as a bill payer who has opened the banking account with Bank 1. The FIS 510 includes a recipient financial account 512 ("recipient account 512"). The recipient account 512 can be a financial account facilitated by, or associated with, the FIS 510, which can be, for example, another commercial bank (e.g., "Bank 2"). For example, the recipient account 512 is a banking account that belongs to, or is associated with, a recipient of money, such as a bill payee.

In accordance with the embodiment of FIG. 5, the FIS 508 includes a payment service system account 506 ("PSS account 506"). The PSS 520 can facilitate the direct bill payment service by using the PSS account 506 facilitated by, or is associated with, the FIS 508. The PSS account 506 can be a financial account, e.g., a banking account, that belongs to, or is associated with, the PSS 520.

In a direct bill payment service, the PSS 520 can process one or more bill payments on behalf of the FIS 502. In particular, upon receiving an identifier of a money recipient and the recipient's payment card information (e.g., debit card number, CVV, expiration date, etc.), the PSS 520 can cause at least two operations to occur. First, the PSS 520 can communicate with the FIS 508 to cause monetary funds to be transferred from the PSS account 506 to the recipient account 512 via a debit transfer 514, which results in the money being deposited substantially instantaneously into the recipient account 512.

Second, the PSS 520 can communicate with the FIS 502 to cause monetary funds to be transferred from the sender account 504 to the PSS account 506. In particular, the PSS 520 can cause the transfer by communicating with the FIS 502 to execute an ACH transfer 516, where the ACH transfer 516 results in the funds being deposited into the PSS account 506 from the sender account 504. The ACH transfer 516 can be a debit transfer of funds that is executed by the ACH. For example, the PSS 520 communicates with the ACH to provide information about the FIS 502 and the FIS 508 (and more particularly, about the sender account 504 and the PSS account 506, respectively) to initiate the ACH transfer 516. In response, the ACH causes funds to be transferred from the sender account 504 to the PSS account 506. In this example, as the ACH typically processes large volumes of credit and/or debit transfers in batches, the funds would be deposited into the PSS account 506 between 2-3 days.

In accordance with the embodiment of FIG. 5, the funds from the sender account 504 may be deposited into the PSS account 506 after the PSS 520 has caused the debit transfer 514. For example, in a typical scenario, the ACH processes transactions in batches, resulting in the funds being transferred after 2-3 days. In this example, the PSS account 506 may not receive the funds from the sender account 504 to transfer to the recipient account 512. As such, the PSS account 506 utilizes funds of its own (e.g., existing account balance) to deposit funds indicative of the bill payment amount into the recipient account 512, and receives the funds via the ACH transfer 516 as a reimbursement.

Figure 6:
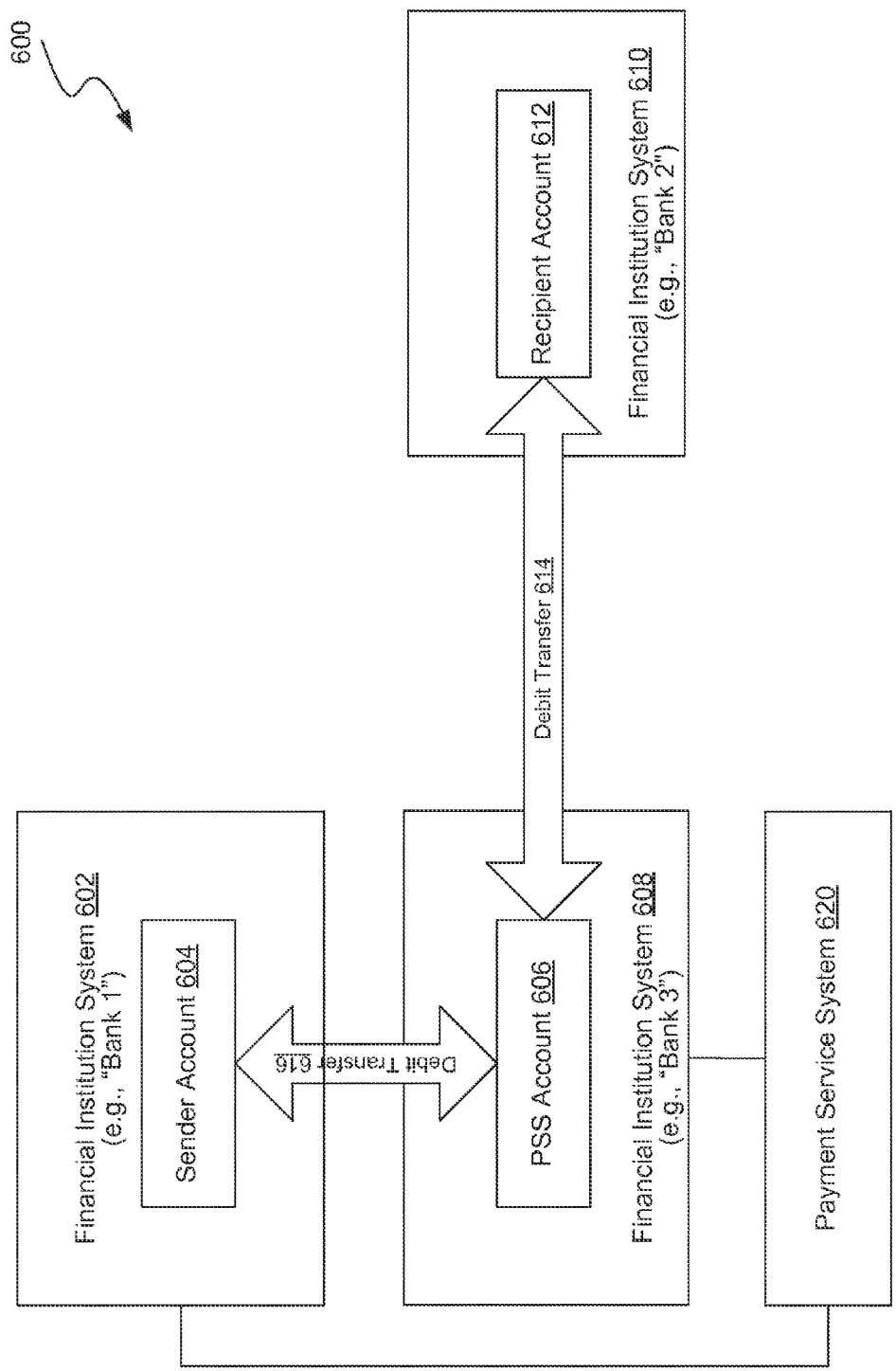
FIG. 6 is a block diagram illustrating a payment service system facilitating a funds transfer associated with a bill payment according to a third embodiment.

FIG. 6 is an environment 600 in which a payment service system 620 facilitates a money transfer associated with a bill payment according to a second embodiment. The environment 600 includes a financial institution system 602 ("FIS 602"), a financial institution system 610 ("FIS 610"), and the payment service system 620 ("PSS 620"). According to some embodiments, the FIS 602 can be the FIS 120 of FIG. 1, the FIS 610 can be the FIS 130 of FIG. 1, and the PSS 620 can be the PSS 110 of FIG. 1. The PSS 620 facilitates a direct bill payment service on behalf of various parties, such as customers of the PSS 620, customers of the FIS 602 (e.g., a sender of money or bill payer), and/or customers of the FIS 610 (e.g., a recipient of money or bill payee). The environment 600 also includes a financial institution system 608 ("FIS 608") that is associated with the PSS 620. The PSS 620 can communicate with the FIS 602, the FIS 608, and the FIS 610 over a wired or wireless communications network.

In accordance with the embodiment of FIG. 6, the FIS 602 includes a sender financial account 604 ("sender account 604"). The sender account 604 can be a financial account facilitated by, or associated with, the FIS 602, which can be, for example, a commercial bank (e.g., "Bank 1"). The sender account 604 is, for example, a banking account that belongs to, or associated with, a sender of money, such as a bill payer who has opened the banking account with Bank 1. The FIS 610 includes a recipient financial account 612 ("recipient account 612"). The recipient account 612 can be a financial account facilitated by, or associated with, the FIS 610, which can be, for example, another commercial bank (e.g., "Bank 2"). For example, the recipient account 612 is a banking account that belongs to, or is associated with, a recipient of money, such as a bill payee.

In accordance with the embodiment of FIG. 6, the FIS 608 includes a payment service system account 606 ("PSS account 606"). The PSS 620 can facilitate the direct bill payment service by using the PSS account 606 facilitated by, or is associated with, the FIS 608. The PSS account 606 can be a financial account, e.g., a banking account, that belongs to, or is associated with, the PSS 620.

In a direct bill payment service, the PSS 620 can process one or more bill payments on behalf of the FIS 602 (e.g., on behalf of a customer, or account holder, of the FIS 602). In particular, upon receiving an identifier of a money recipient and the recipient's payment card information (e.g., debit card number, CVV, expiration date, etc.), the PSS 620 can cause at least two operations to occur. First, the PSS 620 can communicate with the FIS 608 to cause monetary funds to be transferred from the PSS account 606 to the recipient account 612 via a debit transfer 614, which results in the money being deposited substantially instantaneously into the recipient account 612.

Second, the PSS 620 can communicate with the FIS 602 to cause monetary funds to be transferred from the sender account 604 to the PSS account 606. In particular, the PSS 620 can cause the transfer by communicating with the FIS 602 to execute a debit transfer 616, which results in monetary funds being substantially instantaneously deposited into the PSS account 606 from the sender account 604. As debit transfers typically require a debit processing fee, the funds deposited into the PSS account 606 can include the debit processing fee along with the actual amount for the bill payment. In other instances, however, the funds include only the actual amount for the bill payment, and the debit processing fee is transferred at a later time (e.g., as a batch of debit processing fees for a set of debit transfer transactions).

Figure 7:
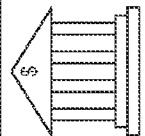

FIG. 7 is a user interface diagram of a banking institution interface 700 that can be generated by a user device of a user, such as a bill payer. The banking institution interface 700 presents to the user a variety of services, including a bill payment service that allows the user to pay a bill by requesting that a bill payment be sent to an individual, such as a bill payee. The banking institution interface 700 can be part of an application (e.g., App 124 of FIG. 1A) that is executed by a server computer system of a banking institution (e.g., FIS 120 of FIG. 1A). The user of the user device can initiate the bill payment service by launching the application and selects the "Pay a Bill" action button displayed on the banking institution interface 700.

Figure 8:
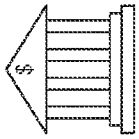

FIG. 8 is a user interface diagram of a bill payment service interface 800 that can be generated by a user device of a user, such as a bill payer. The bill payment service interface 800 presents to the user one or more fields to input information to initiate a bill payment to a bill payee. The one or more fields can include, for example, an "Enter Description" field, an "Enter Amount" field, and an "Add Bill Payee" action button. The one or more fields can also include, for example, "My Recent Bill Payees" to enable the user to select recent bill payees, thereby providing a quick, convenient, and pleasant user experience.

Figure 9:
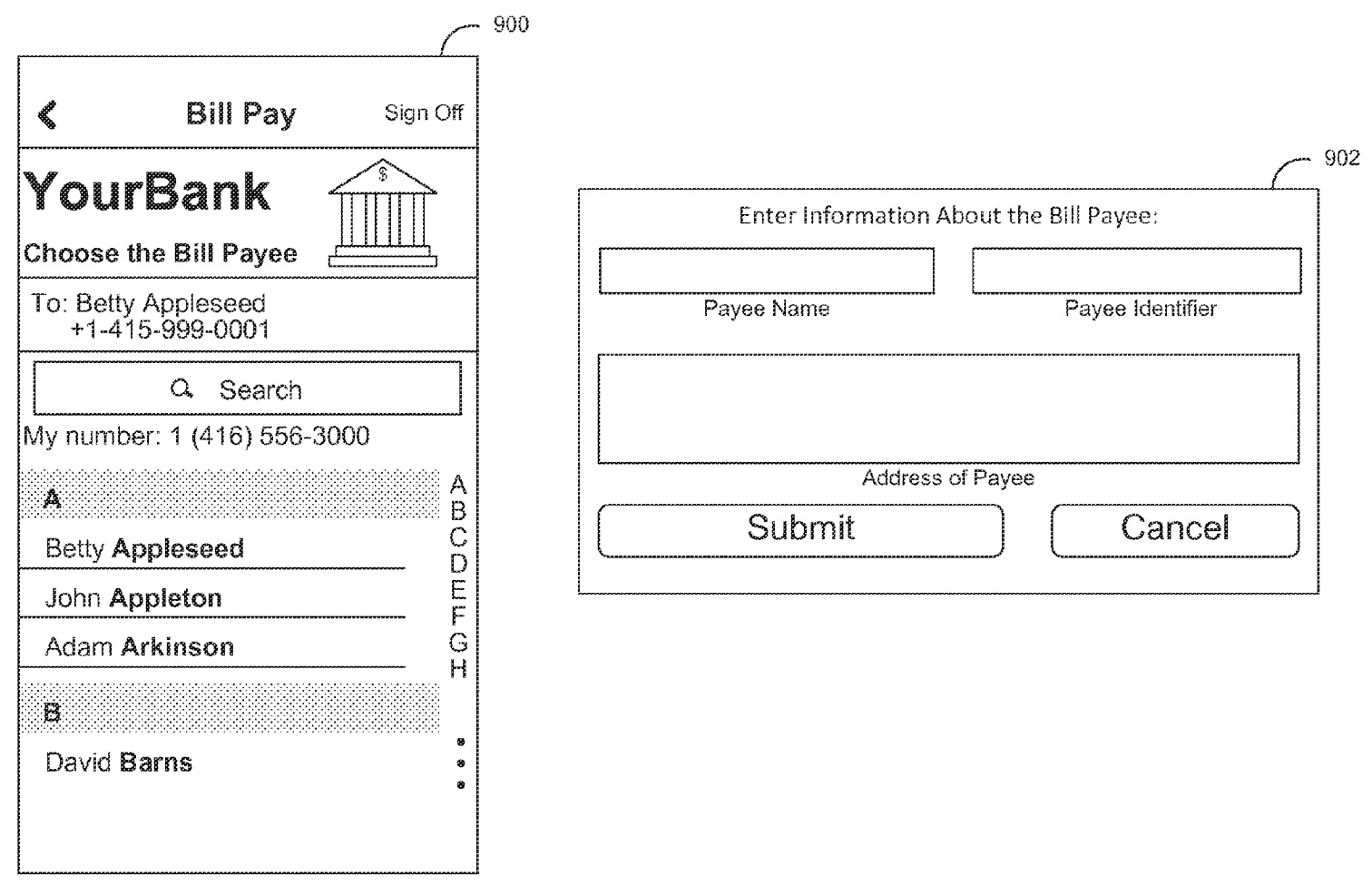

FIG. 9 are user interface diagrams of a first bill payee selection interface 900 in accordance with a first embodiment, and a second bill payee selection interface 902 in accordance with a second embodiment. The first and second bill payee selection interfaces 900, 902 can be generated by a user device of a user, such as a bill payer. The first bill payee selection interface 900 presents to the user a list of names from which to select the bill payee. In some embodiments, the first bill payee selection interface 900 can be integrated with a "Contacts" application running on the user device. The second bill payee selection interface 902 presents to the user one or more fields to input information about the bill payee, thereby providing a free-form for the user to submit information (as opposed to a selection from an existing list). The one or more fields can include, for example, a "Payee Name" field, a "Payee Identifier" field, and an "Address of Payee" field. The one or more fields can also include a "Submit" action button and a "Cancel" action button.

Figures 10, 11:
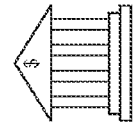

FIG. 10 is a user interface diagram of a bill payment summary interface 1000 that can be generated by a user device of a user, such as a bill payer. The bill payment summary interface 1000 presents to the user a summary of information inputted by the user to request for a bill payment amount to be sent to an individual, such as a bill payee. The bill payment summary interface 1000 can include a description, an amount, a selected bill payee (or recipient of the funds), and a "Send" action button. In some embodiments, the bill payment summary interface 1000 can include an option to change the selected bill payee (e.g., "Change Bill Payee" action button). In some embodiments, the bill payment summary interface 1000 can include an option to add another bill payee in addition to the selected bill payee (e.g., "Add Bill Payee" action button).

In some embodiments, the bill payment summary interface 1000 can be generated for the bill payee, as opposed to the bill payer. In such embodiments, the bill payment summary interface 1000 presents to the bill payee a summary of information inputted to request for a bill payment amount to be requested from the bill payer. Further, in such embodiments, the bill payment summary interface 1000 can include an option to change the selected bill payer (e.g., "Change Bill Payer" action button), and an option to add another bill payer in addition to the selected bill payer (e.g., "Add Bill Payer" action button).

FIG. 11 is a user interface diagram of a bill payment confirmation interface 1100 that can be generated by a user device of a user, such as a bill payer. The bill payment confirmation interface 1100 can include a confirmation message (e.g., "Bill Payment Sent. Check your messages for a confirmation."). In some embodiments, the bill payment confirmation interface 1100 can also include an action button to return to a main interface of the application (e.g., banking institution interface 700 of FIG. 7).

Figure 12:
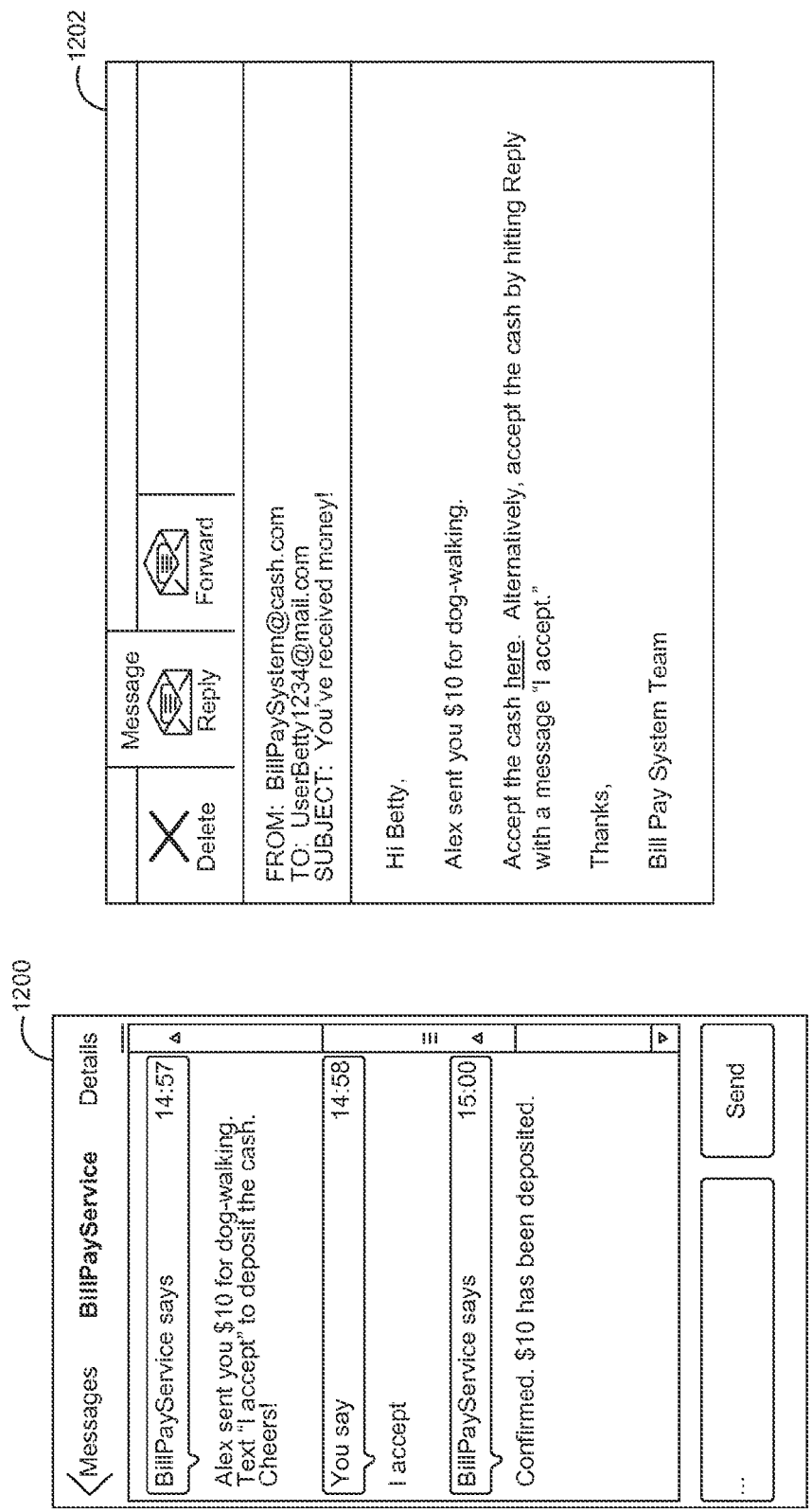

FIG. 12 are user interface diagrams of a bill payment confirmation text message 1200 and a bill payment confirmation email message 1202, in accordance with some embodiments. The payment confirmation text message 1200 can be generated and displayed on a text messaging application installed on a user device of a user, such as a bill payee. The bill payment confirmation email message 1202 can be generated and displayed on an email application installed on the user device. In some embodiments, the bill payment confirmation text message 1200 and the bill payment confirmation email message 1202 can be generated and displayed on a user device of a bill payer. In such embodiments, the content of the messages 1200, 1202, can be, for example, a notification that the bill payment is successful (e.g., "Success! The bill payee has received the cash.").

Figure 13:
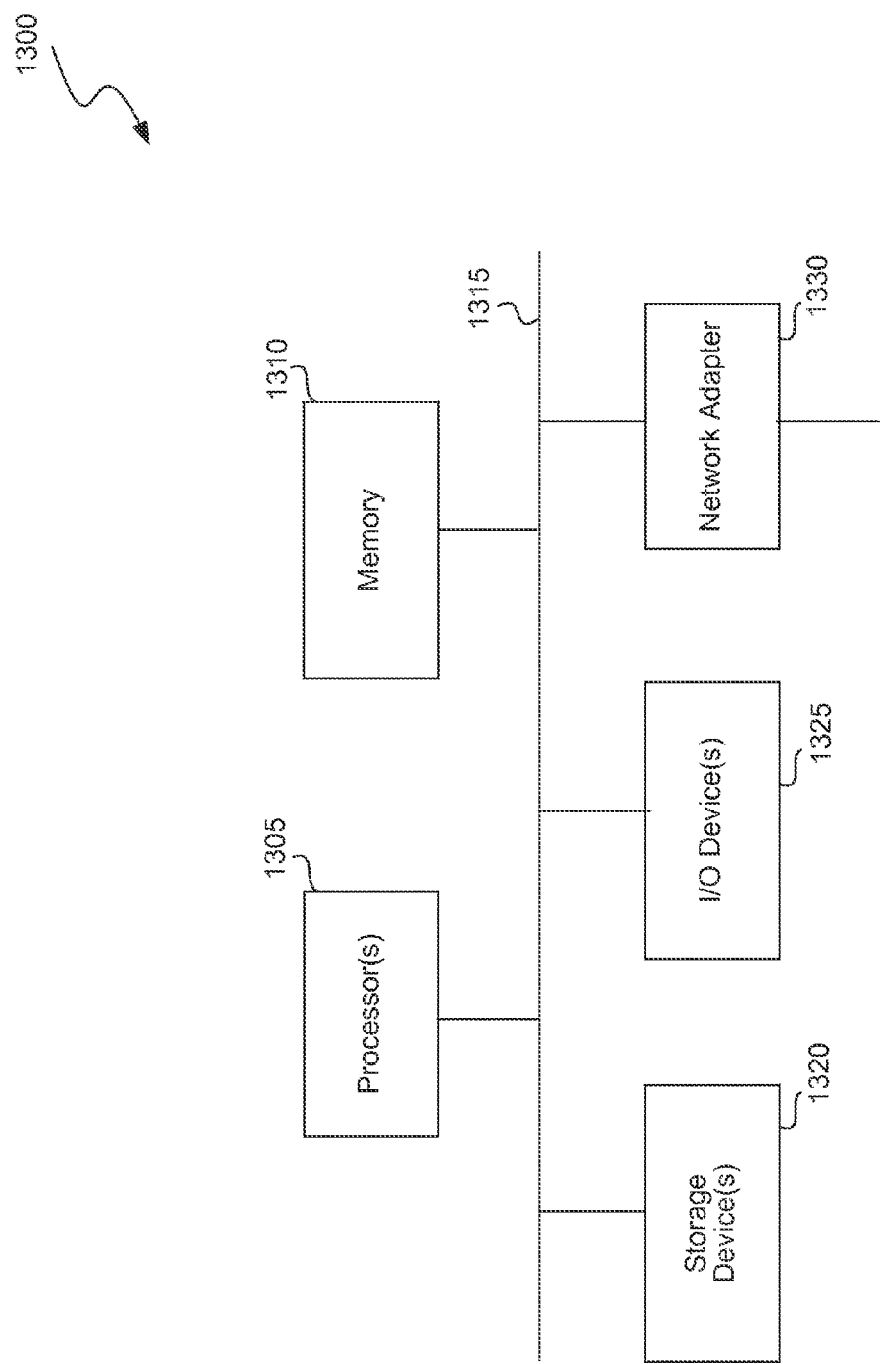
FIG. 13 is a block diagram of an example computer system in which at least some operations related to the bill payment technology can be implemented.

FIG. 13 is a block diagram of a computer system as may be used to implement features of some embodiments of the bill payment technology. In some embodiments, the computer system can be the PSS 110 of FIGS. 1A-1C. In some embodiments, the computer system can be the user device 104 of FIGS. 1A-1C. In some embodiments, the computer system can be the user device 106 of FIGS. 1A-1C. In some embodiments, the computer system can be the FIS 120 of FIGS. 1A-1C. In some embodiments, the computer system can be the FIS 130 of FIGS. 1A-1C. The computing system 1300 may include one or more central processing units ("processors") 1305, memory 1310, input/output devices 1325 (e.g., keyboard and pointing devices, display devices), storage devices 1320 (e.g., disk drives), and network adapters 1330 (e.g., network interfaces) that are connected to an interconnect 1315.

The storage devices 1320 can be used to store, for example, association data between identifiers and payment card information (and/or payment cards), user profile data, transaction data, and any other data, e.g., for implementing the bill payment technology. The network adapters 1330 may be or include, for example, an Ethernet adapter, cable modem, Wi-Fi adapter, cellular transceiver, Bluetooth transceiver, or the like, or a combination thereof. The interconnect 1315 is illustrated as an abstraction that represents any one or more separate physical buses, point to point connections, or both connected by appropriate bridges, adapters, or controllers, and/or other conventional connection devices.

The memory 1310 and storage devices 1320 are computer-readable storage media that may store instructions that implement at least portions of the various embodiments. In addition, the data structures and message structures may be stored or transmitted via a data transmission medium, e.g., a signal on a communications link. Various communications links may be used, e.g., the Internet, a local area network, a wide area network, or a point-to-point dial-up connection. Thus, computer readable media can include computer-readable storage media (e.g., "non transitory" media) and computer-readable transmission media. Note that one of ordinary skill in the art will recognize that "memory" is one form of a "storage" and that the terms may on occasion be used interchangeably.

The instructions stored in memory 1310 can be implemented as software and/or firmware to program the processor(s) 1305 to carry out actions described above. In some embodiments, such software or firmware may be initially provided to the processing system 1300 by downloading it from a remote system through the computing system 1300 (e.g., via network adapter 1330).

Unless contrary to physical possibility, it is envisioned that (i) the methods/steps described above may be performed in any sequence and/or in any combination, and that (ii) the components of respective embodiments may be combined in any manner.

The various embodiments of the bill payment technology introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Although the bill payment technology has been described with reference to specific exemplary embodiments, it will be recognized that the bill payment technology is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method for enabling bill payment performed by a payment service system on behalf of a banking service facilitated by a banking server system, the method comprising:

receiving, at a banking application executing on a user device of a bill payer, a bill payment request from the bill payer, the bill payment request including a bill payment amount and a payee identifier of a bill payee, the payee identifier being any of an email address or a telephone number, wherein the banking application is associated with the banking service and is facilitated by the banking server system;

transmitting, by the banking application, the bill payment request to the banking server system;

upon receiving the bill payment request, identifying, by the banking server system, a payer debit card of the bill payer, wherein the payer debit card is associated with a payer account of the bill payer that is managed by the banking service;

transmitting, by the banking server system, bill payer information and bill payee information to the payment service system for processing on behalf of the banking server system, the bill payer information including payer debit card information associated with the payer debit card and the bill payee information including the bill payment amount and the payee identifier included in the bill payment request;

upon receiving the bill payer information and the bill payee information, processing, by the payment service system, the bill payment request on behalf of the banking service, said processing including:

accessing a database associated with the payment service system that maintains association data between user identifiers and user debit cards, wherein the association data is gathered, by the payment service system, from past transactions involving the payment service system in which at least some of the user debit cards were used;

identifying, from the association data in the database, a payee debit card of the bill payee based on an association between the payee identifier and the payee debit card;

in response to identifying the payee debit card, initiating, by the payment service system, a deposit of monetary funds into a payee account associated with the payee debit card, the payee account being a payee bank account at a financial institution, the monetary funds indicative of the bill payment amount included in the bill payment request from the bill payer at the banking application, wherein the initiating includes:

transferring, by the payment service system, the monetary funds from a payment service account of the payment service system into the payee bank account via a debit transfer;

transmitting, by the payment service system, a reimbursement request to the banking server system; and after transferring the monetary funds from the payment service account of the payment service system into the payee bank account via the debit transfer, receiving, by the payment service system, a reimbursement amount deposited into the payment service account, wherein the reimbursement amount is transferred from the payer account to the payment service account based on a ledger entry adjustment executed by the banking server system that internally effects a transfer of the reimbursement amount from the payer account to the payment service account, wherein the payer account and the payment service account are financial accounts at the banking service facilitated by the banking server system; and transmitting, by the payment service system and to the user device for display by the banking application, a money transfer confirmation to notify the bill payer the transfer is complete.

2. The method of claim 1, wherein said initiating the deposit of the monetary funds comprises:

transferring, by the payment service system, the monetary funds from the payment service account of the payment service system to the payee account; and transmitting, by the payment service system, the reimbursement request to the banking server system, the reimbursement request requesting the reimbursement amount to be deposited into the payment service account, the reimbursement amount being a reimbursement of the monetary funds to the payment service system.

3. The method of claim 2, further comprising:

receiving, from the banking server system, the reimbursement amount deposited into the payment service account, wherein the reimbursement amount is transferred from the payer account to the payment service account via the ledger entry adjustment, wherein the payer account and the payment service account are financial accounts facilitated by the banking server system.

4. The method of claim 2, further comprising:

receiving, from the banking server system, the reimbursement amount deposited into the payment service account, wherein the reimbursement amount is transferred from the payer account to the payment service account via an Automated Clearing House (ACH) transfer.

5. The method of claim 1, wherein said initiating the deposit of the monetary funds comprises:

transferring, by the payment service system, the monetary funds from the payer account associated with the payer debit card to the payee account associated with the payee debit card via the debit transfer.

6. A method of processing a bill payment, comprising:

receiving, by a payment service system and from a financial institution system, a money transfer message associated with a sender having a sender financial account associated with the financial institution system, the money transfer message including sender account information and recipient information for transferring money from the sender to a recipient, the recipient information including a recipient identifier and a payment amount to be sent to the recipient;

generating, by the payment service system, a database that maintains association data between user identifiers and user debit cards, wherein the association data is gathered from past transactions involving the payment service system and at least some of the user debit cards;

upon receiving the money transfer message, processing, by the payment service system, the money transfer message on behalf of the financial institution system, said processing including:

accessing the database associated with the payment service system that maintains association data between the user identifiers and the user debit cards; and identifying, from the association data in the database, a recipient debit card of the recipient based on an association between the recipient identifier and the recipient debit card;

in an event that the recipient debit card is identified, initiating, by the payment service system, a deposit of funds indicative of the payment amount from a payment service financial account associated with the payment service system into a recipient financial account associated with the recipient debit card, wherein the funds indicative of the payment amount are deposited into the recipient financial account via a debit transfer; and after initiating the deposit of funds indicative of the payment amount into the recipient financial account, receiving, by the payment service system, a reimbursement amount for deposit into the payment service financial account associated with the payment service system, wherein the reimbursement amount is transferred from the sender financial account to the payment service financial account based on a ledger entry adjustment executed by the financial institution system that internally effects a transfer of the reimbursement amount.

7. The method of claim 6, wherein the recipient identifier is an email address or a telephone number.

8. The method of claim 6, further comprising:

in an event that the recipient debit card is not identified, transmitting, by the payment service system, a message to the recipient based on the recipient identifier, the message configured to prompt the recipient to submit recipient debit card information associated with the recipient debit card.

9. The method of claim 8, further comprising:

receiving, by the payment service system, the recipient debit card information from the recipient;

validating the recipient debit card information; and upon successful validation, causing the funds indicative of the payment amount to be deposited into the recipient financial account associated with the recipient debit card.

10. The method of claim 6, wherein initiating the deposit of the funds comprises:

transferring, by the payment service system, the funds from the payment service financial account to the recipient financial account; and transmitting, by the payment service system, a reimbursement message to the financial institution system, the reimbursement message requesting the reimbursement amount to be deposited into the payment service financial account, the reimbursement amount being a reimbursement of the funds indicative of the payment amount to the payment service system.

11. The method of claim 10, further comprising:

receiving, from the financial institution system, the reimbursement amount deposited into the payment service financial account, wherein the reimbursement amount is transferred from the sender financial account to the payment service financial account via an ACH transfer.

12. The method of claim 6, wherein the sender account information includes sender debit card information associated with a sender debit card, the sender debit card associated with the sender financial account.

13. The method of claim 12, wherein initiating the deposit of the funds comprises:
transferring the funds indicative of the payment amount from the sender financial account associated with the sender debit card to the recipient financial account associated with the recipient debit card via the debit transfer.

14. The method of claim 12, wherein the sender account information includes a sender identifier and an enrollment status.

15. The method of claim 14, wherein the enrollment status is active, the method further comprises:
based on the enrollment status, storing the sender identifier in association with the sender debit card.

16. The method of claim 15, further comprising:
receiving, by the payment service system, a money request message associated with the recipient, the money request message including the sender identifier and a request amount for requesting money to be transferred from the sender to the recipient;
based on the money request message, identifying, by the payment service system, the sender debit card associated with the sender identifier; and
in an event that the sender debit card is identified, initiating the deposit of funds indicative of the request amount into the recipient financial account associated with the recipient debit card, wherein the funds are deposited via a debit transfer.

17. The method of claim 16, further comprising:
prior to initiating the deposit of the funds indicative of the request amount, transmitting an approval request to the sender to approve the request amount from the recipient.

18. The method of claim 16, wherein the money request message is received from a second financial institution system, wherein the recipient financial account is associated with the second financial institution system, wherein the second financial institution system is the financial institution system or a different financial institution system.

19. The method of claim 6, wherein the past transactions include direct bill payments executed by the payment service system on behalf of a financial institution system associated with the financial institution system, another financial institution, or the recipient.

20. A payment service system for processing a bill payment request, comprising:
a network interface through which to communicate with remote systems;
a processor coupled to the network interface; and
a memory coupled to the processor, the memory storing instructions to perform the steps comprising:
receiving, from a recipient financial institution system, a bill payment request message associated with a recipient having a recipient financial account associated with the recipient financial institution system, the bill payment request message including recipient account information and sender information for requesting a bill payment from a sender to be transferred to the recipient, the sender information including a sender identifier and a payment request amount to be requested from the sender, the recipient account information including recipient payment card information associated with a recipient payment card of the recipient;
processing the bill payment request message, said processing including:
accessing a database associated with the payment service system that maintains association data between user identifiers and user debit cards, wherein the association data is gathered, by the payment service system, from past transactions in which at least some of the user debit cards were used;
identifying, from the association data in the database, a sender payment card of the sender based on an association between the sender identifier and the sender payment card;
initiating a deposit of funds indicative of the payment request amount into the recipient financial account associated with the recipient payment card using the sender payment card, wherein the funds indicative of the payment request amount are deposited into the recipient financial account via a debit transfer, said initiating including transferring the funds from a payment service financial account associated with the payment service system into the recipient financial account via the debit transfer; and
after transferring the funds from the payment service financial account of the payment service system into the recipient financial account via the debit transfer, receiving, by the payment service system, a reimbursement amount deposited into the payment service account, wherein the reimbursement amount is transferred from a sender account to the payment service account by effecting a transfer of the reimbursement amount from the sender account to the payment service account.

21. The payment service system of claim 20, wherein the sender identifier is an email address or a telephone number.

22. The payment service system of claim 20, wherein the instructions for initiating the deposit of the funds indicative of the payment request amount into the recipient financial account comprise:
transmitting a reimbursement message to a sender financial institution system associated with the sender payment card, the reimbursement message requesting a reimbursement amount to be deposited into the payment service financial account, the reimbursement amount being a reimbursement of the funds indicative of the payment request amount.

23. The payment service system of claim 22, wherein the reimbursement amount is transferred from a sender financial account associated with the sender payment card to the payment service financial account via any of:
a ledger entry adjustment, wherein the sender financial account and the payment service financial account are financial accounts facilitated by the sender financial institution system; or
an Automated Clearing House (ACH) transfer.

24. The payment service system of claim 22, wherein the sender financial institution system is any of a same or a different financial institution system as the recipient financial institution system.

* * * * *